United States Patent
Nicewonger

(10) Patent No.: US 12,221,917 B2
(45) Date of Patent: Feb. 11, 2025

(54) APPARATUS FOR DELIVERY AND RETRACTION OF FLUIDS

(71) Applicant: Proteus Industries Inc., Mountain View, CA (US)

(72) Inventor: Mark R Nicewonger, Mountain View, CA (US)

(73) Assignee: Proteus Industries Inc., Mountain View, CA (US)

( * ) Notice: Subject to any disclaimer, the term of this patent is extended or adjusted under 35 U.S.C. 154(b) by 59 days.

(21) Appl. No.: 18/208,569

(22) Filed: Jun. 12, 2023

(65) Prior Publication Data

US 2023/0323806 A1    Oct. 12, 2023

Related U.S. Application Data

(63) Continuation-in-part of application No. 17/326,318, filed on May 20, 2021, now Pat. No. 11,674,722.

(60) Provisional application No. 63/027,896, filed on May 20, 2020.

(51) Int. Cl.
*F01P 7/14*        (2006.01)

(52) U.S. Cl.
CPC .......... *F01P 7/14* (2013.01); *F01P 2007/143* (2013.01); *F01P 2007/146* (2013.01)

(58) Field of Classification Search
CPC ... F01P 7/14; F01P 2007/143; F01P 2007/146
See application file for complete search history.

(56) References Cited

U.S. PATENT DOCUMENTS 7,299,645 B2 * 11/2007 Oshitani ................. F25B 41/00
                                                                    62/191

* cited by examiner

*Primary Examiner* — Eric Keasel
(74) *Attorney, Agent, or Firm* — Francis Law Group

(57) ABSTRACT

System, method, and apparatus for controlling circulation of fluid to, and evacuation of the fluid from, an external fluid circuit for heat transfer. A single control valve selectively stops the circulation of fluid from a supply passageway to an external fluid circuit and diverts fluid to a bypass passageway which creates a suction force at a venturi valve region therein. The venturi valve region includes a fluid jacket that encases at least a portion of the venturi valve region. A suction passageway couples the suction force of bypass passageway to either return passageway or supply passageway, for evacuating fluid from external fluid circuit. No more than a single suction passageway is required to be coupled to either supply passageway and/or return passageway. A return check valve disposed in return passageway prevents backflow of fluid through return passageway.

22 Claims, 29 Drawing Sheets

Coolant Flow ➡ (140)
Suction Flow ➡ (142)
Coolant + Suction Flow ⇨ (245)

APPARATUS FOR DELIVERY AND RETRACTION OF FLUIDS

CROSS-REFERENCES TO RELATED APPLICATIONS

This application is a continuation-in-part of U.S. application Ser. No. 17/326,318, filed May 20, 2021, which claims priority to U.S. Provisional Application No. 63/027,896, filed May 20, 2020.

FIELD OF THE INVENTION

The present invention(s) relate generally to heat exchanger systems. More particularly, the invention(s) relate to systems, apparatus and methods for controlling liquid coolant flow to and from an external device.

BACKGROUND OF THE INVENTION

Resistance welding, i.e., spot welding, machines require cooling heat-exchanger systems, typically employing a liquid coolant, to maintain the copper welding electrodes below a maximum temperature. These cooling heat-exchanger systems largely prevent the electrodes from deforming due to excess heat, where such deformation may lead to poor quality in the welded joint and possible fusing of the electrode to the sheet metal being spot-welded. Typically, circulating water-coolant systems are used to cool the spot-welding machine electrodes.

The electrodes are designed to be periodically replaced for scheduled preventative maintenance, poor performance, or failure. The base end of the electrode accommodates an internal circulation of the coolant, typically water, to remove heat. The circulation of water can be blocked on a supply side to the electrode, and on a return side from the electrode, thereby creating an isolated section of the flow path. This isolated section would ideally have zero fluid pressure, thereby accommodating removal of the electrode. However, residual pressurized water can remain in the isolated section, and escape from the gap created in the flow path when the electrode is removed. This undesired water spillage may create hazards for the welding equipment and operations personnel.

Although past systems may reduce spillage to some degree by simply shutting off water flow at the source when a welding electrode is removed, this is not optimal because spillage can still occur from the residual water in the coolant system. Past system designs have sought to stop or minimize spillage by utilizing mechanical devices, such as a piston in a cylinder, to generate a suction force to pull water back from a coolant line where electrodes are planned to be removed. However, the effectiveness of such systems is limited by the fixed stroke of the piston, and therefore limited suction potential. Such systems are also subject to maintenance issues because of water contacting the piston and cylinder.

Some non-mechanical system designs do not require moving parts, like a piston, to accomplish the evacuation. Such non-mechanical systems eliminate the shortcomings of a piston and cylinder through the use of multiple valves, one in each of multiple fluid lines, slated for either normal cooling operation, or for drawing suction to evacuate fluid from the electrode coolant line.

SUMMARY OF THE INVENTION

A coolant control apparatus for controlling liquid coolant flow to and from an external device.

In a preferred embodiment, the coolant control apparatus includes an external fluid circuit, which is coupled to the external device, and a three-way control valve that is coupled to a supply passageway and adapted to selectively stop circulation of the liquid coolant to the apparatus through the external fluid circuit, while simultaneously diverting the liquid coolant through a bypass passageway, which couples the supply passageway to a return passageway.

In some embodiments, the three-way control valve is further adapted to stop all liquid coolant flow to all passages.

In a preferred embodiment, no other valve is disposed in the supply passageway or the bypass passageway apart from the control valve, i.e., in at least one embodiment, no more than a single control valve and a single check valve are required in the apparatus to control liquid coolant flow to and from the external device.

In a preferred embodiment, the bypass passageway includes a venturi valve region, i.e., a gradually decreasing cross-sectional area and a gradually increasing cross-sectional area coupled together by a fluid restriction area, which creates a suction force when there is sufficient liquid coolant flow through the fluid restriction area.

In a preferred embodiment, the bypass passageway further includes a fluid jacket that at least partially encases the venturi valve region, and a vacuum orifice that couples the fluid jacket to the fluid restriction area of the venturi valve region, thereby transferring the suction force created in the fluid restriction area to the fluid jacket.

The coolant control apparatus also includes a suction passageway for evacuating at least a portion of the fluid from the external fluid circuit (the coolant lines). Preferably, the suction passageway couples the fluid jacket to the return passageway or supply passageway.

In a preferred embodiment, no more than a single suction passageway is required to be coupled to the supply passageway or return passageway in order to evacuate at least a portion of, or a sufficient quantity of, or all of the liquid coolant from the external fluid circuit (and optionally in the external device coupled to the external fluid circuit) in order to prevent leakage from the external fluid circuit. This prevents liquid coolant from escaping in an external fluid circuit when the external device is detached from the coolant lines, or if a coolant line is intentionally or accidentally disconnected or broken.

In some embodiments, the suction passageway is coupled to both the supply passageway and return passageway.

In some embodiments, the coolant control apparatus further includes a suction check valve, which is disposed in the suction passageway and adapted to prevent a backflow of the liquid coolant from the bypass passageway to the external fluid circuit via the suction passageway and the return passageway when the apparatus is in a bypass mode for evacuating fluid from the external fluid circuit but the fluid flow through the bypass passageway is inadequate to create a suction force. In embodiments, wherein there is a sufficiently high flow rate through the bypass passageway when the apparatus is in bypass mode (for evacuation), no suction check valve is required in the suction passageway.

In some embodiments, the coolant control apparatus includes a second shutoff valve in an optional suction passageway coupled to the supply passageway. The second shutoff valve prevents an incidental flow of the liquid coolant from the supply passageway (downstream of the control valve) through the optional suction passageway to the bypass passageway then finally into the return passageway.

In some embodiments, the coolant control apparatus further includes a return check valve, which is disposed in the return passageway and adapted to prevent a backflow of liquid coolant in the return passageway back into the external fluid circuit, when the apparatus is in a bypass/evacuation mode. In this configuration, liquid coolant from the supply passageway is diverted away from the external fluid circuit into the bypass passageway. In this diverted flow mode, liquid coolant is evacuated from the supply passageway (downstream from the control valve) and/or from the return passageway (upstream from the return check valve).

In at least one embodiment, the coolant control apparatus further includes a single actuator to operate both the supply passageway valve and an optional suction passageway valve. Although no more than a single actuator is required to operate the apparatus, e.g., a single control valve or a combination of the control valve and the suction shutoff valve tied together, in some embodiments, more than one actuator is provided and employed to operate the apparatus.

In some embodiments, the coolant control apparatus includes a vent passageway that couples a supply passageway to atmospheric pressure and is adapted to prevent leakage of liquid coolant from the external circuit.

The Summary of the Invention set forth above is provided to introduce a selection of concepts in a simplified form that are further described below in the Detailed Description of the Invention, set forth below. The Summary is not intended to identify key or essential features of the claimed subject matter, nor is it intended to be used as an aid in determining the scope of the claimed subject matter.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE PREFERRED EMBODIMENT

Figure 1:
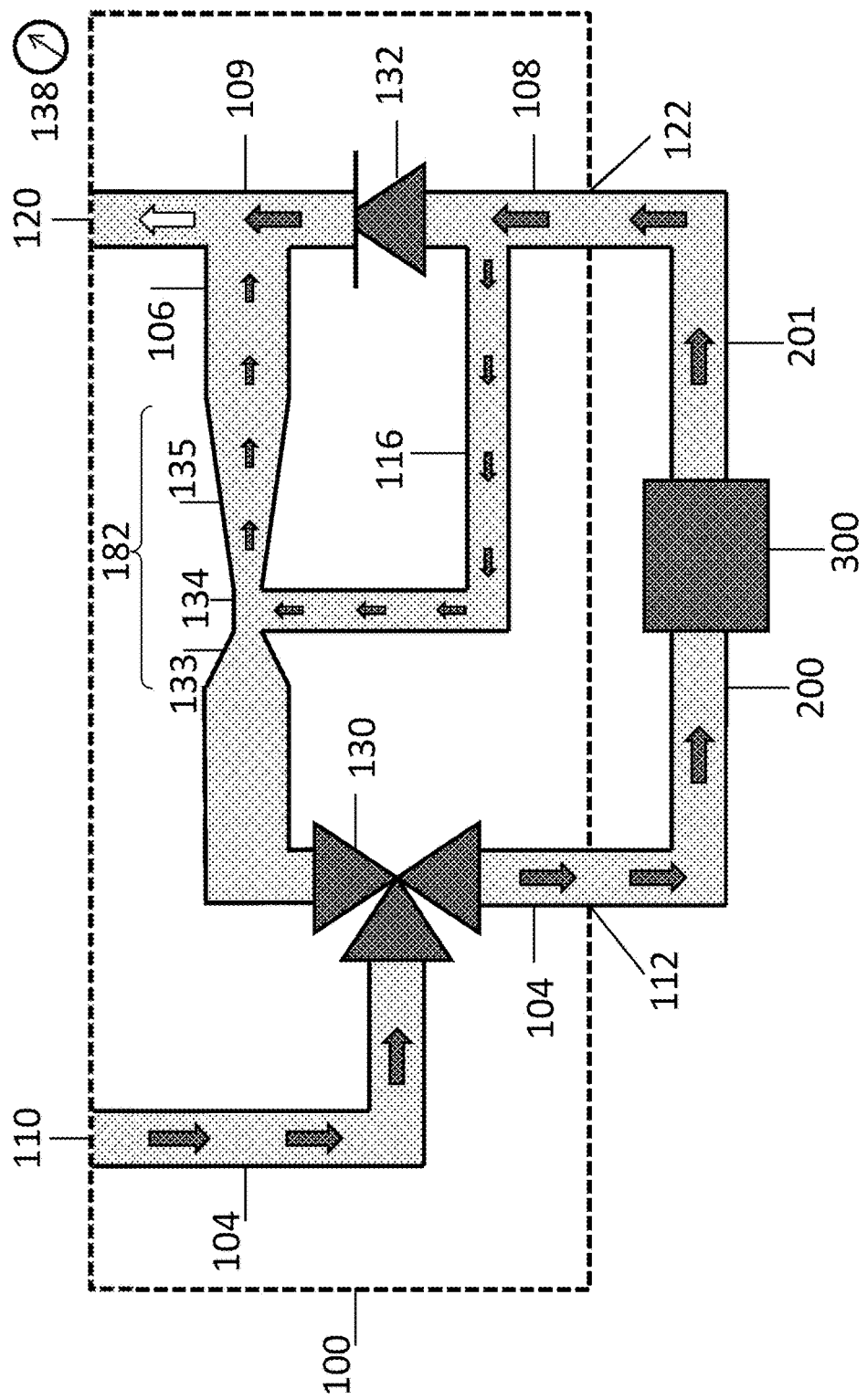
FIG. 1 is a schematic of one embodiment of a coolant control apparatus having an external fluid circuit coupled to an external device, a single control valve in a supply passageway that is coupled to the external fluid circuit, a venturi valve region in a bypass passageway, and a check valve in a return passageway coupled to the external device, according to the invention.

Before describing the present invention in detail, it is to be understood that this invention is not limited to particularly exemplified systems, apparatus, structures or methods as such may, of course, vary. Thus, although a number of systems, apparatus, structures and methods similar or equivalent to those described herein can be used in the practice of the present invention, the preferred systems, apparatus, structures and methods are described herein.

It is also to be understood that the systems, apparatus, methods, operations and processes disclosed herein can be implemented in any means for achieving various aspects, and can be executed in a form of a machine-readable medium, and/or a machine accessible medium, embodying a set of instructions that, when executed by a machine or a data processing system (e.g., a computer system), in one or more different sequences, cause the machine to perform any of the operations disclosed herein. Accordingly, the specification and drawings are to be regarded in an illustrative rather than a restrictive sense.

It is also to be understood that the terminology used herein is for the purpose of describing particular embodiments of the invention only and is not intended to be limiting.

Where a definition or use of a term in a reference, which is incorporated by reference herein, is inconsistent or contrary to the definition of that term provided herein, the definition of that term provided herein applies and the definition of that term in the reference does not apply.

Unless defined otherwise, all technical and scientific terms used herein have the same meaning as commonly understood by one having ordinary skill in the art to which the invention pertains.

Further, all publications, patents and patent applications cited herein, whether supra or infra, are hereby incorporated by reference in their entirety.

LIST OF REFERENCE DESIGNATORS

The following references are employed in the drawings and used in the following descriptions of embodiments of the systems, apparatus and methods to circulate and evacuate liquid coolant from a heat exchanger system of the invention. It is to be understood that the same reference numbers in the drawings indicate like elements throughout the drawings and the descriptions.

| Reference Number | Reference Designator |
|---|---|
| 100 | coolant control apparatus |
| 101 | external fluid circuit |
| 104 | supply passageway |
| 106 | bypass passageway |
| 108 | return passageway |
| 109 | exhaust passageway |
| 110 | source inlet |
| 111 | vent passageway |
| 112 | supply outlet |
| 113 | vent inlet |
| 115 | parallel suction passageway |
| 116 | suction passageway |
| 117 | return suction check valve |
| 120 | exhaust outlet |
| 122 | return outlet |
| 124 | shutoff valve |
| 126 | valve actuator |
| 127 | actuator handle |
| 128 | vent check valve |
| 130 | three-way control valve |
| 131 | valve diaphragm |
| 132 | return check valve |
| 132a | return check valve poppet |
| 132b | return check valve swing gate |
| 133 | coolant inlet |
| 134 | fluid restriction |
| 135 | coolant outlet |
| 136 | low-pressure zone |
| 138 | atmospheric pressure |
| 140 | coolant flow |
| 142 | suction flow of coolant |
| 144 | incidental flow of coolant |
| 146 | air flow |
| 150 | detachment |
| 182 | venturi valve region |
| 200 | first supply line |
| 201 | second supply line |
| 203 | second return line |
| 204 | upstream opening |

| Reference Number | Reference Designator |
| --- | --- |
| 206 | downstream opening |
| 240 | fluid jacket |
| 241 | fluid jacket inlet |
| 242 | fluid jacket vacuum orifice |
| 243 | second fluid jacket inlet |
| 244 | second fluid jacket vacuum orifice |
| 245 | combined coolant + suction flow |
| 246 | combined coolant + incidental flow |
| 247 | suction orifice |
| 300 | first external device |
| 302 | second external device |
| 304 | first connection |
| 306 | second connection |
| 400 | robot arm |
| 402 | welding apparatus |
| 404 | handle stop |
| 406 | pedestal |
| 410 | robotic motion |
| 500 | ancillary cooling circuit |
| 510 | ancillary external device |
| 530 | ancillary coolant flow |
| 520 | ancillary shutoff valve |

Referring now to FIG. 1, there is illustrated a first embodiment of a coolant control apparatus of the invention (denoted "100"). As discussed in detail in Co-Pending Priority application Ser. No. 17/326,318, the coolant control apparatus 100 controls a liquid coolant flow to and from an external device (also referred to herein as the "first external device").

Figure 2A:
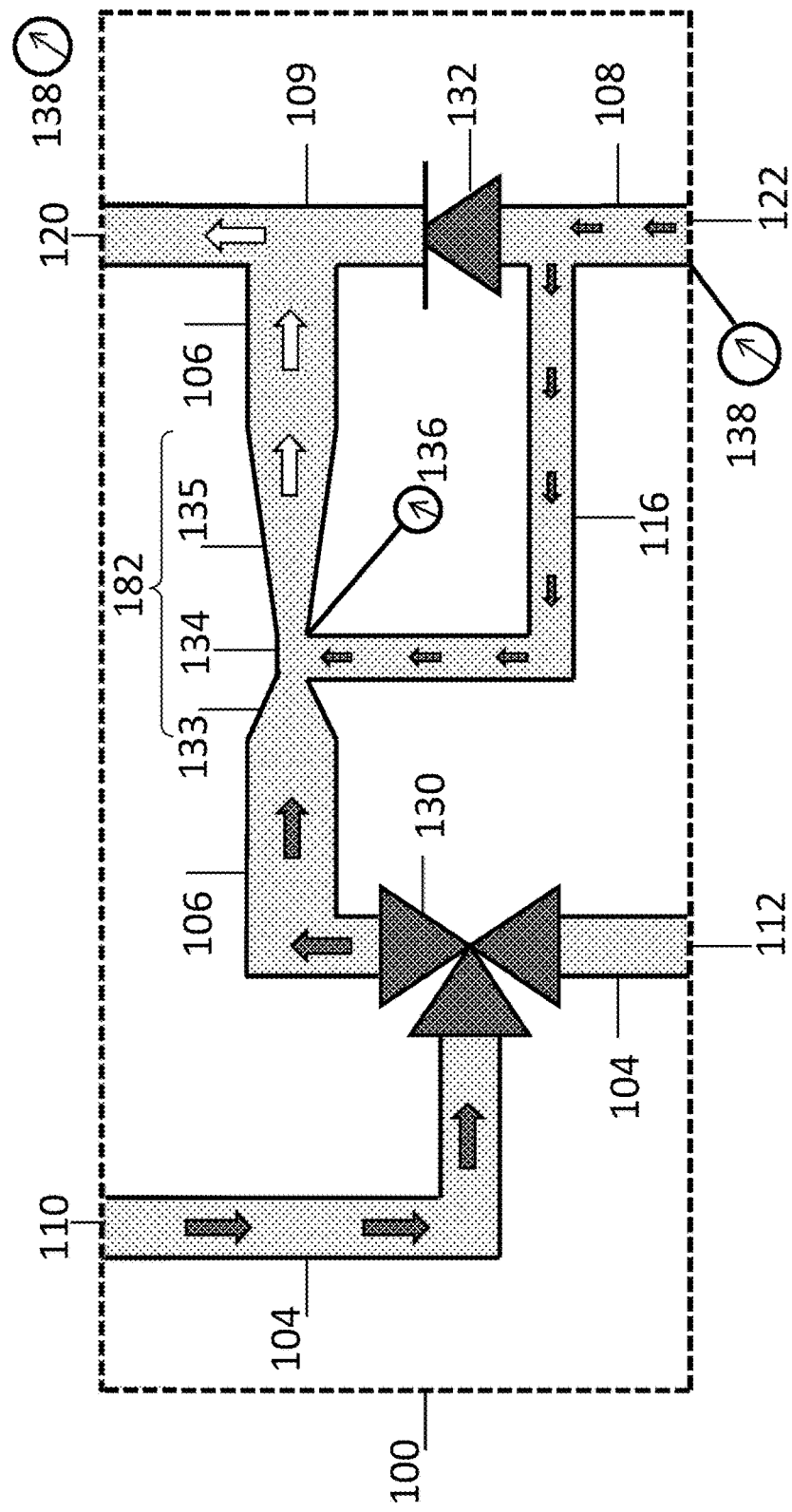
FIG. 2A is a schematic of a further embodiment of the coolant control apparatus shown in FIG. 1, illustrating liquid coolant flow through a bypass passageway and a suction flow of liquid coolant through a suction passageway resulting from the liquid coolant flow through the venturi valve region of the bypass passageway, according to the invention.

As illustrated in FIGS. 1 and 2A, the liquid coolant enters the apparatus 100 at a source inlet 110 and flows through a supply passageway 104 to a three-way control valve 130, which is adapted to selectively (i) allow the flow of the liquid coolant to continue through the supply passageway 104, out a supply outlet 112 and into and through the first supply line 200 that is coupled to the external cooled device 300, as illustrated in FIG. 1, and (ii) divert the flow of the liquid coolant into and through the bypass passageway 106, through an exhaust passageway 109 and out of the apparatus 100 through an exhaust outlet 120, as illustrated in FIG. 2A.

As set forth in Co-Pending Priority application Ser. No. 17/326,318, the three-way control valve 130 is further adapted to block the flow of the liquid coolant entering through the source inlet 110 from entering into apparatus 100 passageways, e.g., the supply passageway 104, first supply line 200, bypass passageway 106, etc.

As further illustrated in FIG. 1, after passing through the first supply line 200 and external device 300, the liquid coolant passes through a first return line 201 and re-enters the apparatus 100 at a return inlet 122, and flows through a return passageway 108, return check valve 132, and exhaust passageway 109 before finally being discharged from the apparatus 100 at an exhaust outlet 120. As also illustrated in FIG. 1, an incidental flow 144 of the liquid coolant can also pass through a suction passageway 116 and into and through the bypass passageway 106.

As illustrated in FIG. 2A, the coolant control apparatus 100 further comprises a return check valve 132, which is coupled to the return passageway 108 and exhaust passageway 109. The return check valve 132 is adapted to prevent a backflow of the liquid coolant from the exhaust passageway 109 to the return passageway 108 and return inlet 122.

In a preferred embodiment, the bypass passageway 106 comprises a venturi valve region 182. As illustrated in FIG. 1, in this embodiment, the venturi valve region 182 comprises a coolant inlet 133 having a gradually decreasing cross-sectional area, a coolant outlet 135 having a gradually increasing cross-sectional area and a fluid restriction 134 therebetween, whereby a sufficient flow of the liquid coolant through the fluid restriction 134 creates a low-pressure zone 136 having a pressure of the liquid coolant that is less than an atmospheric pressure 138 surrounding the apparatus 100.

As further illustrated in FIG. 2A, the suction passageway 116 referenced above is coupled to the fluid restriction 134 of the venturi valve region 182 and the return passageway 108.

According to the invention, when the return coolant inlet 122 is open to the atmospheric pressure 138 while sufficient liquid coolant flow 140 is passing through the fluid restriction 134 in the venturi valve region 182, the pressure difference between the low-pressure zone 136 and the atmospheric pressure 138 induces a suction flow 142 of a portion of the liquid coolant contained in the return passageway 108 to be drawn through the suction passageway 116, and combined with the liquid coolant flow 140 passing through the bypass passageway 106 to be discharged from the apparatus 100 through the exhaust passageway 109 and exhaust outlet 120.

Figure 2B:
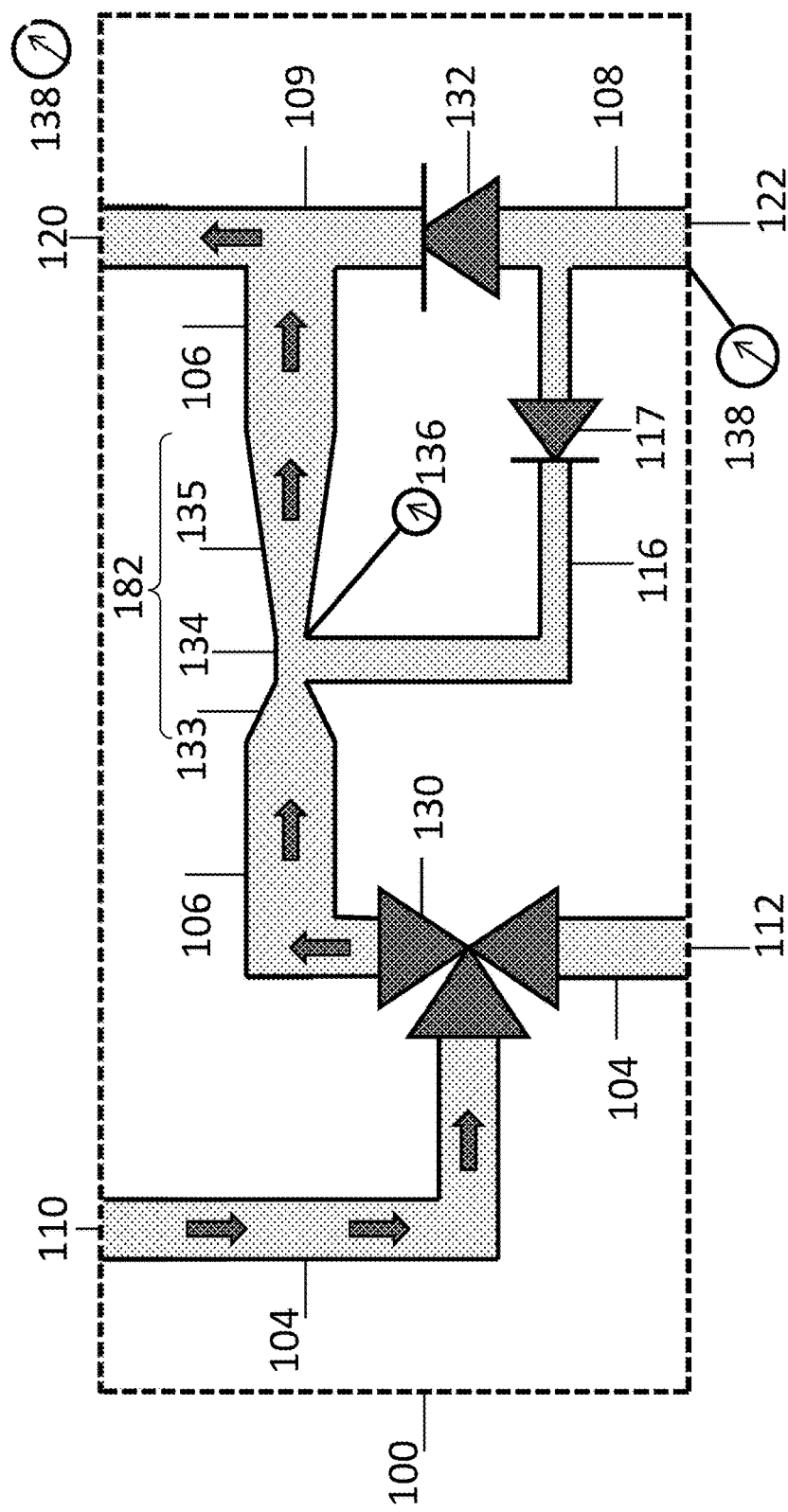
FIG. 2B is a schematic of a further embodiment of the coolant control apparatus shown in FIG. 2A having a suction check valve in the suction passageway to prevent a backflow of the liquid coolant through the suction passageway when the liquid coolant flow through the bypass passageway is inadequate to create a suction force, according to the invention.

Referring now to FIG. 2B, in some embodiments, the coolant control apparatus 100 further comprises a return suction check valve 117 that is disposed in the suction passageway 116. The return suction check valve 117 is adapted to prevent an unintended portion of the liquid coolant flow 140 from escaping through the suction passageway 116 and return passageway 108 when the return inlet 122 is open to the atmospheric pressure 138 and the liquid coolant flow 140 through the fluid restriction 134 in the venturi valve region 182 is insufficient to create the first low-pressure zone 136.

Figure 2C:
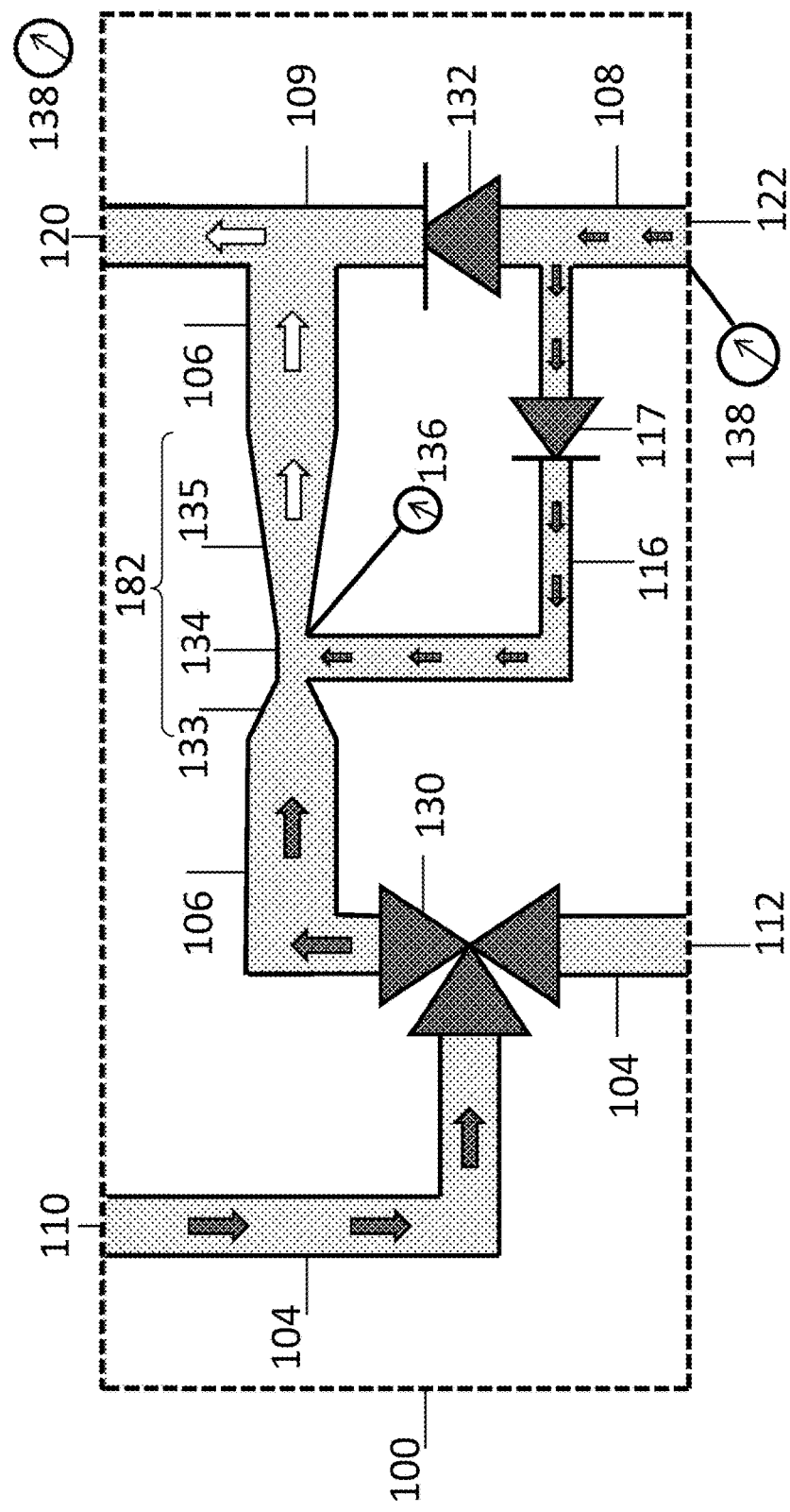
FIG. 2C is a further schematic of the coolant control apparatus shown in FIG. 2B, illustrating liquid coolant flow through the bypass passageway and a suction flow of liquid coolant through the suction check valve and, thereby suction passageway resulting from an adequate flow of the liquid coolant through the bypass passageway, according to the invention.

In a preferred embodiment, the return suction check valve 117 is further adapted to allow a suction flow 142 of a portion of the liquid coolant that is contained in the return passageway 108 to be drawn through the suction passageway 116 when the liquid coolant flow 140 passing through the fluid restriction 134 in the venturi valve region 182 is sufficient to create a low-pressure zone 136, while the return inlet 122 is open to the atmospheric pressure 138, as shown in FIG. 2C.

Figure 3A:
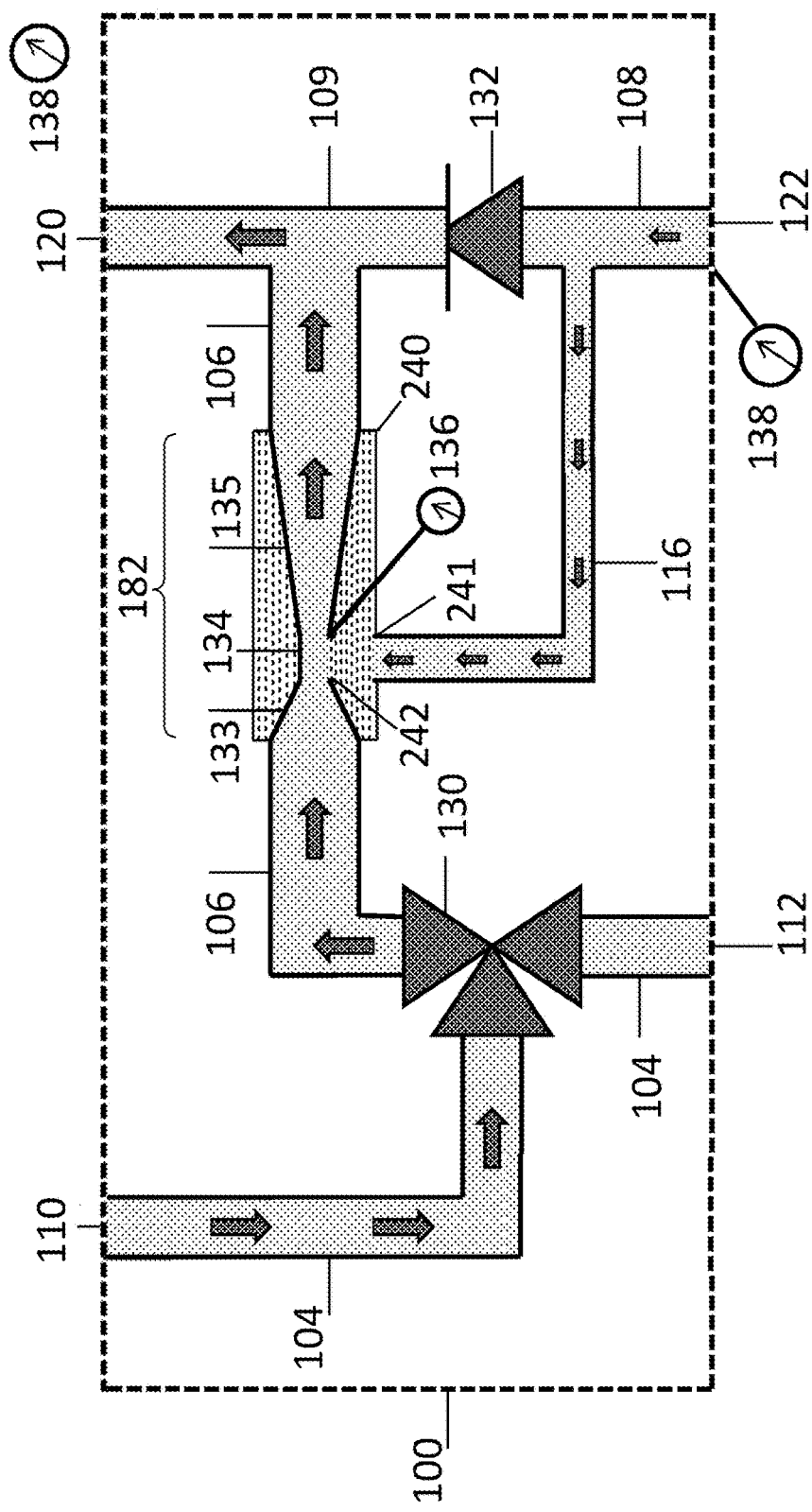
FIG. 3A is a schematic of a further embodiment of the coolant control apparatus shown in FIGS. 1 and 2A, wherein the apparatus further comprises a fluid jacket disposed around the venturi valve region in the bypass passageway, according to the invention.
Figure 3B:
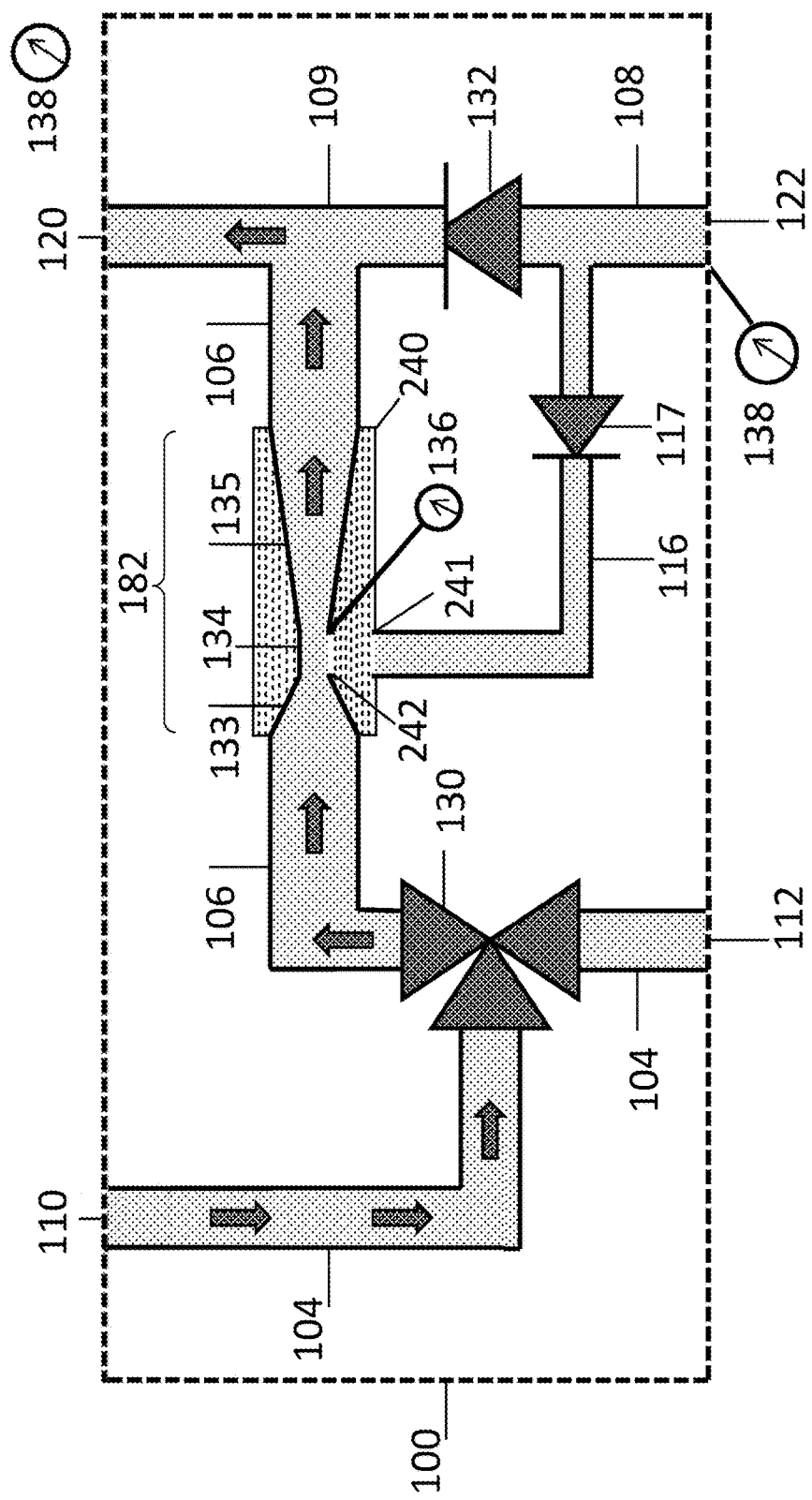
FIG. 3B is a schematic of further embodiment of the coolant control apparatus shown in FIG. 3A, wherein the apparatus further comprises the suction check valve in the suction passageway to prevent the backflow of the liquid coolant through the suction passageway when the liquid coolant flow through the bypass passageway is inadequate to create a suction force, according to the invention.

Referring now to FIGS. 3A and 3B, there are illustrated further embodiments of the coolant control apparatus 100 illustrated in FIGS. 1 and 2B, which are similarly adapted to control liquid coolant flow 140 to and from an external device, such as device 300 illustrated in FIG. 1.

The apparatus 100 illustrated in FIG. 3A and 3B similarly comprise the supply outlet 112, three-way control valve 130, bypass passageway 106, return inlet 122, return passageway 108, suction passageway 116, return check valve 132, exhaust passageway 109, and exhaust outlet 120. The apparatus 100 illustrated in FIG. 3B additionally comprises the aforementioned return suction check valve 117.

As further illustrated in FIGS. 3A and 3B, in a preferred embodiment, the venturi valve region (now denoted "182") further comprises a fluid jacket 240, which is sized and configured to encase at least a portion of the venturi valve region 182.

Figure 3C:
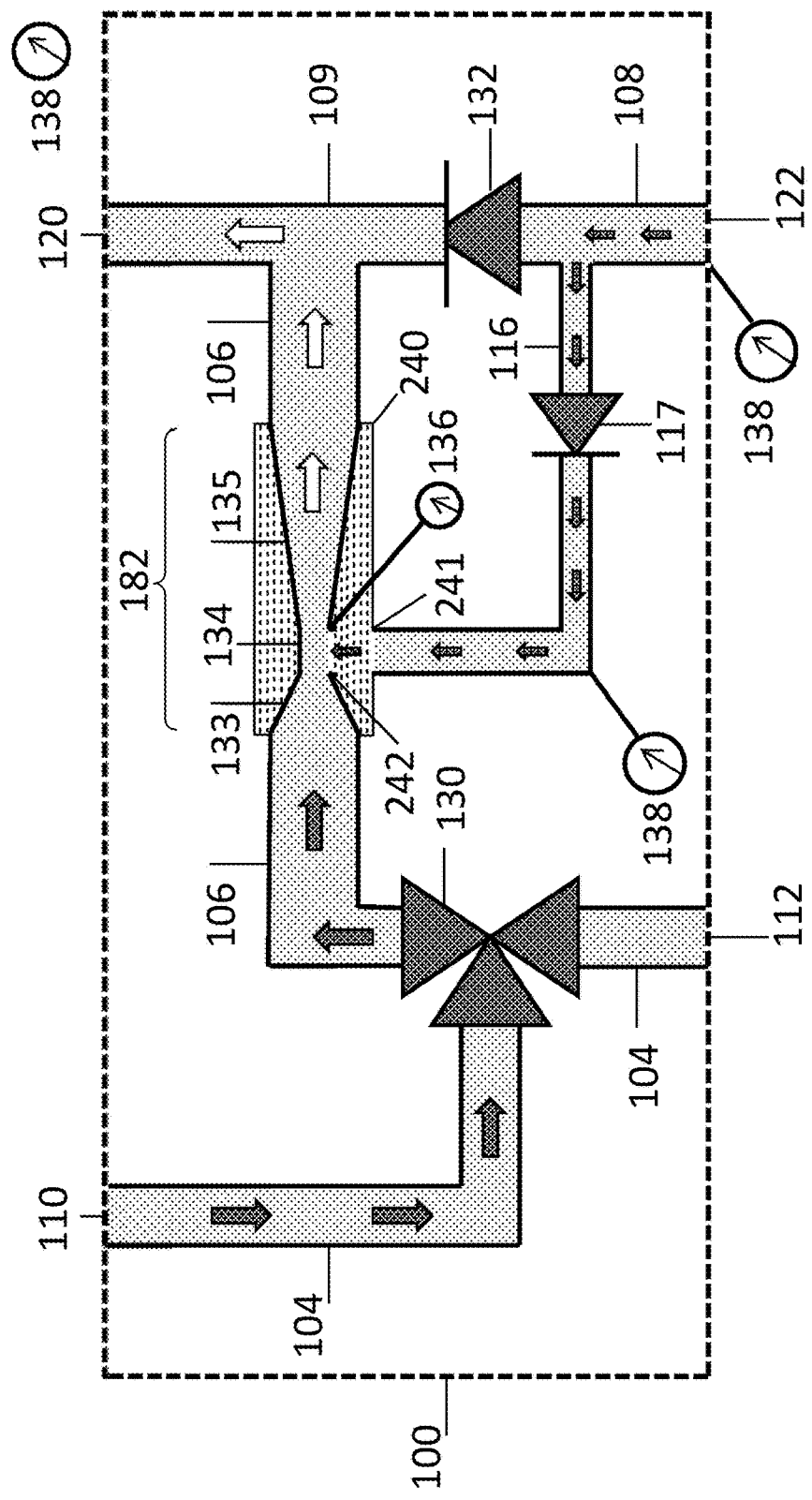
FIG. 3C is a further schematic of the coolant control apparatus shown in FIG. 3B, illustrating liquid coolant flow through the bypass passageway and suction flow of liquid coolant from the fluid jacket and through the suction passageway resulting from an adequate flow of the liquid coolant through the bypass passageway, according to the invention.

In some embodiments, the fluid jacket 240 is coupled to the suction passageway 116 via a fluid jacket inlet 241 and the bypass passageway 106 via a fluid jacket vacuum orifice 242, as illustrated in FIGS. 3A-3C.

According to the invention, coupling of the fluid restriction 134 to the suction passageway 116 via the fluid jacket 240 does not require the outer perimeter of the venturi valve region 182 to include an outer annular groove to couple a suction force generated by the venturi valve region 182 to the suction passageway 116.

Inclusion of the fluid jacket 240 allows for the suction passageway 116 to be coupled to any point on the fluid jacket 240, either radially or axially to the bypass passageway 106.

As illustrated in FIG. 3C, according to the invention, when the return coolant inlet 122 is open to the atmospheric pressure 138 while sufficient liquid coolant flow 140 is passing through the fluid restriction 134, the pressure difference between the low-pressure zone 136 and the atmospheric pressure 138 is coupled to the return passageway 108 via the fluid jacket 240, the fluid jacket vacuum orifice 242, the fluid jacket inlet 241, and the suction passageway 116, whereby a suction flow 142 is induced to evacuate a portion of the liquid coolant contained in the return passageway 108, being drawn through the suction passageway 116 and the fluid jacket 240 and combined with the liquid coolant flow 140 passing through the bypass passageway 106 to be discharged from the apparatus 100 through the exhaust passageway 109 and exhaust outlet 120.

Figure 3D:
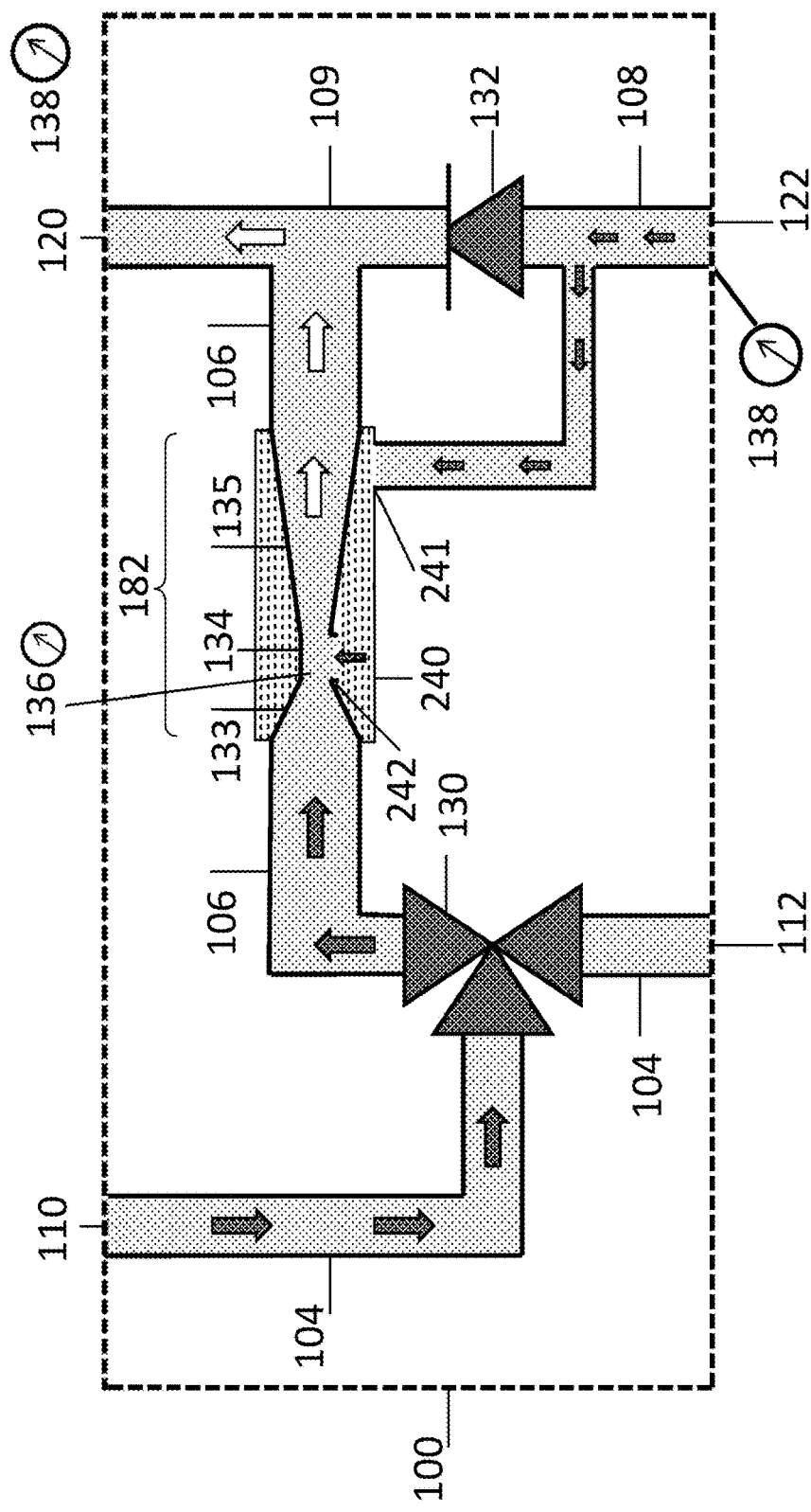
FIGS. 3D and 3E are further schematics of the coolant control apparatus shown in FIG. 3A, wherein the suction passageway is either radially or axially coupled to any point of the fluid jacket, according to the invention.
Figure 3E:
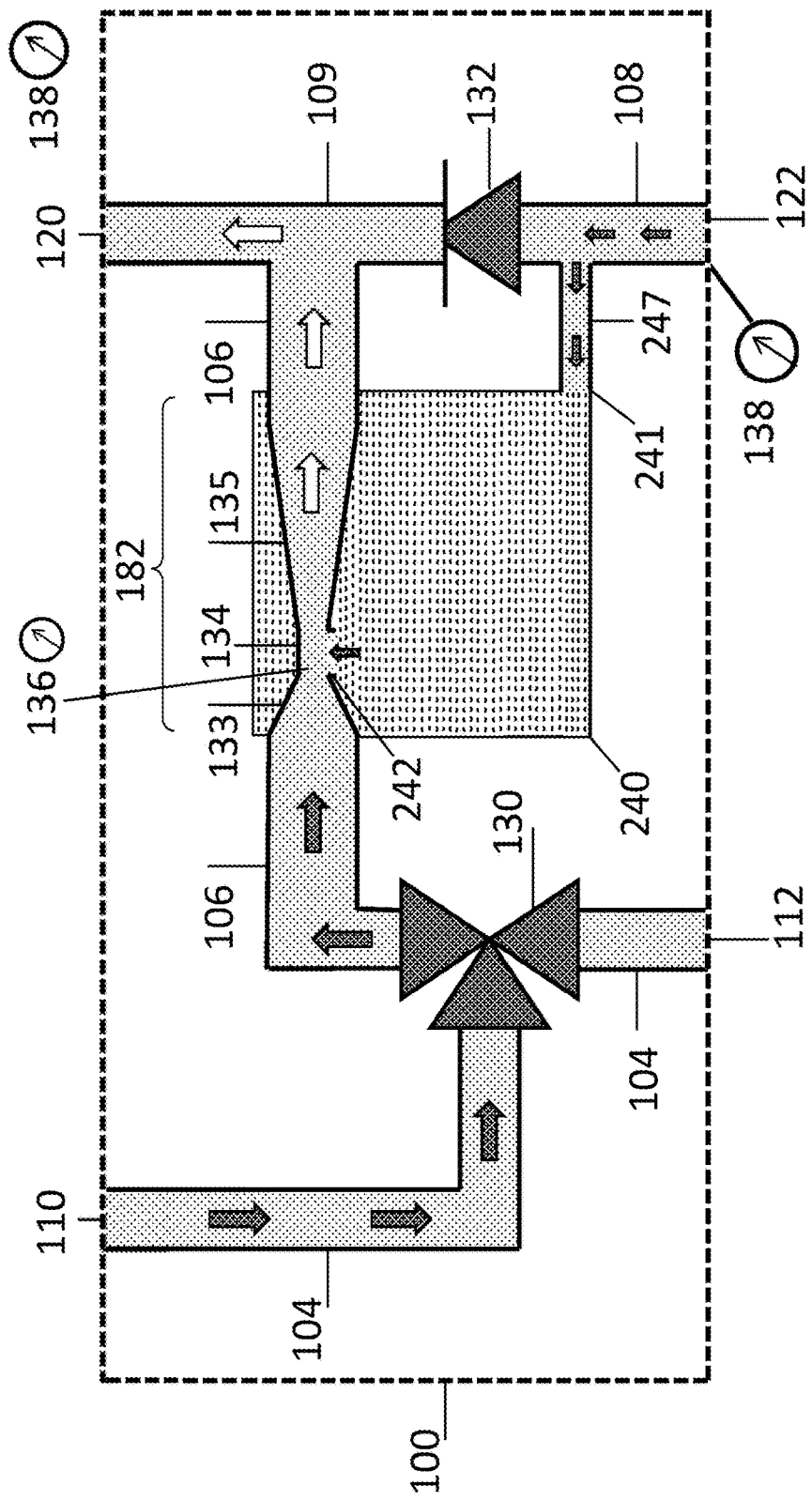
Figure 4:
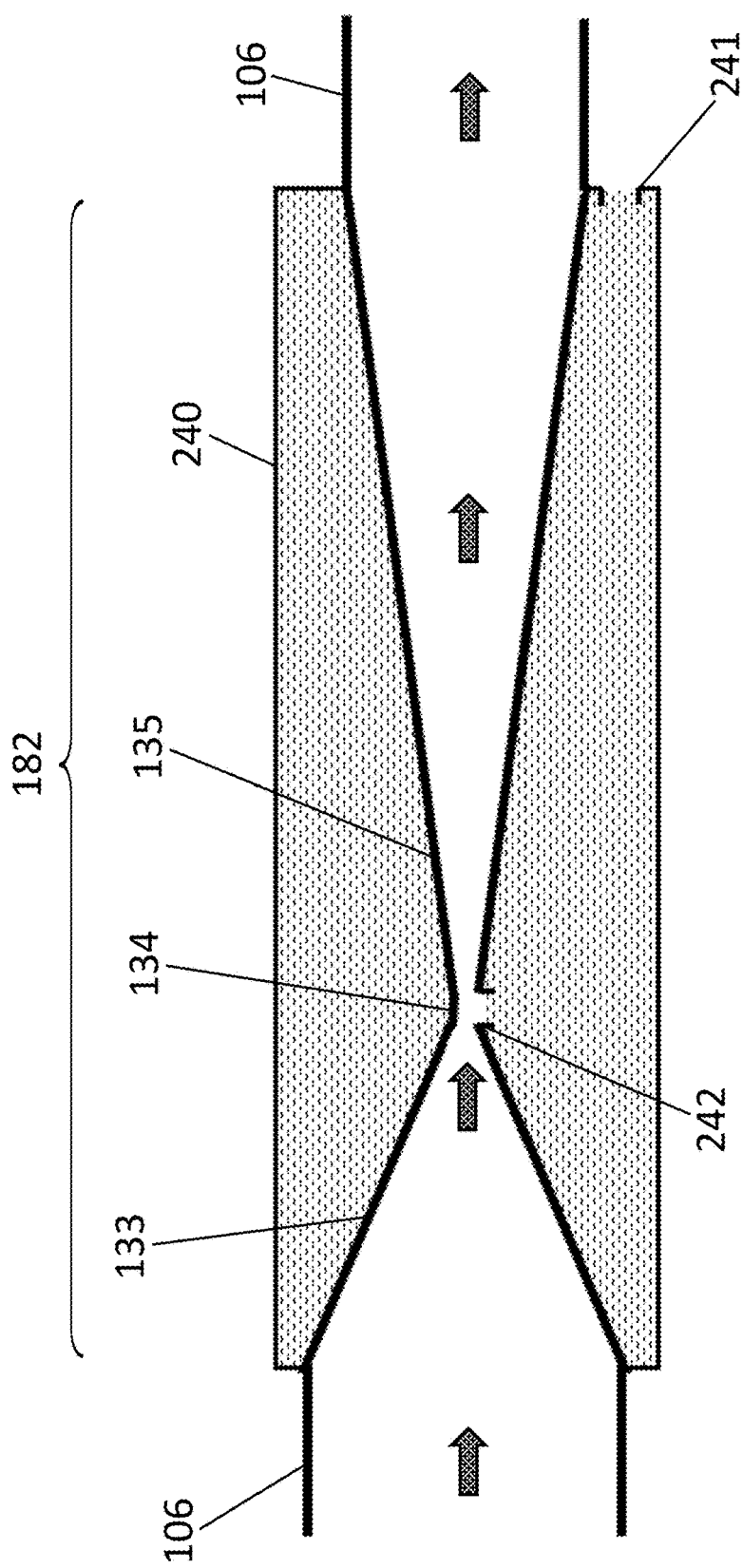
FIG. 4 is an illustration of a fluid jacket that comprises a suction inlet that is oriented axially to the longitudinal axis of the bypass passageway, according to the invention.

According to the invention, the fluid jacket inlet 241 can be positioned either radially to the longitudinal axis of the bypass passageway 106 at any position on the fluid jacket 240, such as illustrated in FIGS. 3A through 3D, or axially at any external point on the fluid jacket 240, such as illustrated in FIGS. 3D and 4.

In a preferred embodiment, the fluid jacket inlet 241 and the vacuum orifice are positioned in a radially downward direction relative to the longitudinal axis of the bypass passageway 106 (proximate the venturi valve region 182), as illustrated in FIGS. 3B and 3C.

According to the invention, the downward orientation of the fluid jacket inlet 241 and fluid jacket vacuum orifice 242 facilitates drainage of the liquid coolant from the venturi valve region 182 and, hence, fluid jacket 240 when the coolant control apparatus 100 is not in use. Thus, when the apparatus 100 is not in use and is subjected to freezing conditions, the noted drainage of the liquid coolant provided by the downward orientation of the fluid jacket inlet 241 and fluid jacket vacuum orifice 242 substantially reduces the possibility of damage to the venturi valve region 182 and/or fluid jacket 240 due to ice formation.

According to the invention, the fluid jacket 240 can be sized and configured to receive and contain any volume of liquid coolant.

According to the invention, the inlet diameter of the coolant inlet 133 can be equal to or greater than the outlet diameter of the coolant outlet 135. In a preferred embodiment, the inlet diameter of the coolant inlet 133 is greater than the outlet diameter of the coolant outlet 135.

Figure 3F:
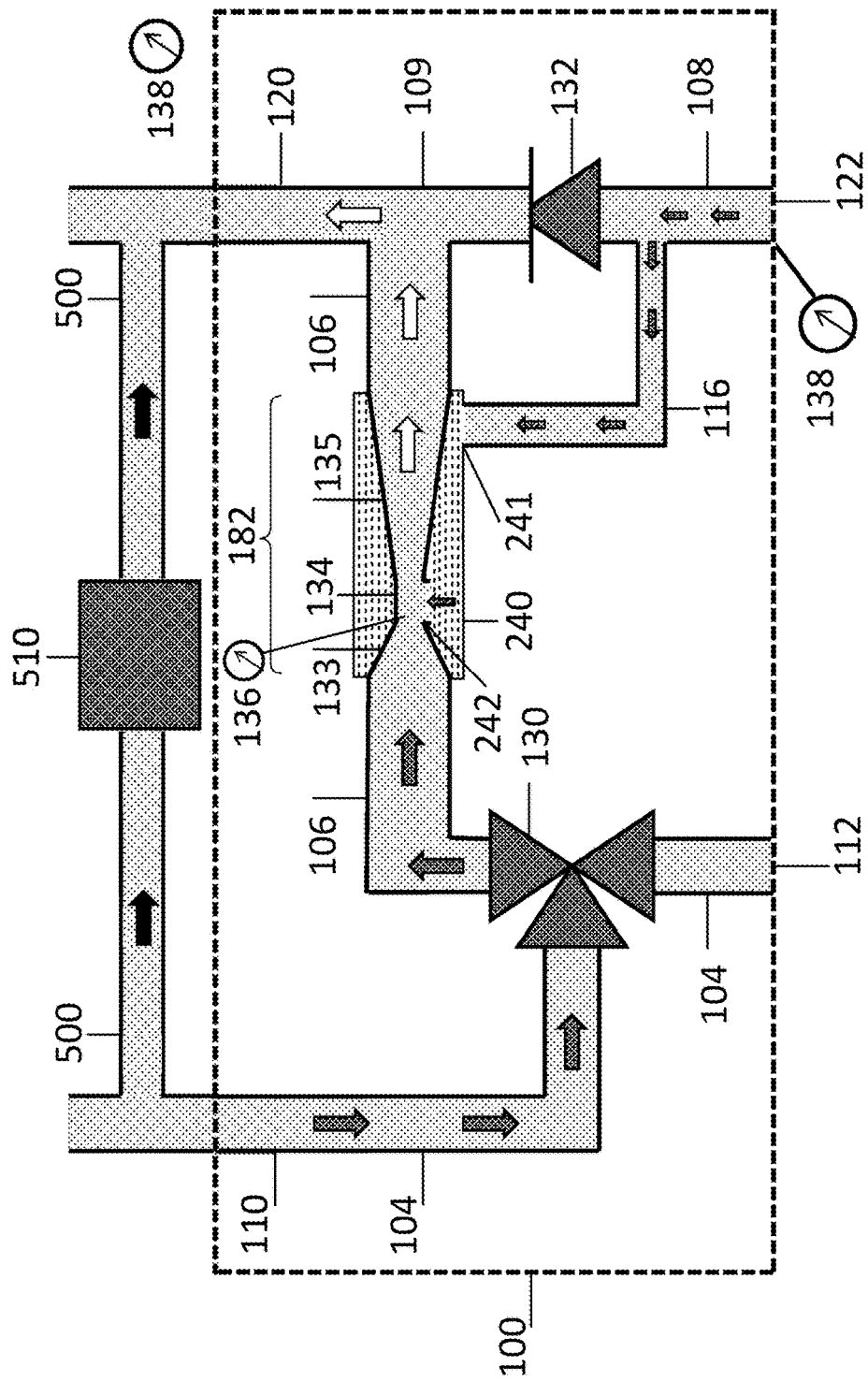
FIG. 3F is a further schematic of the coolant control apparatus shown in FIG. 3A, wherein the apparatus is disposed in proximity to an ancillary external device and has an ancillary cooling circuit, showing ancillary coolant flow through the ancillary device, according to the invention.
Figure 3G:
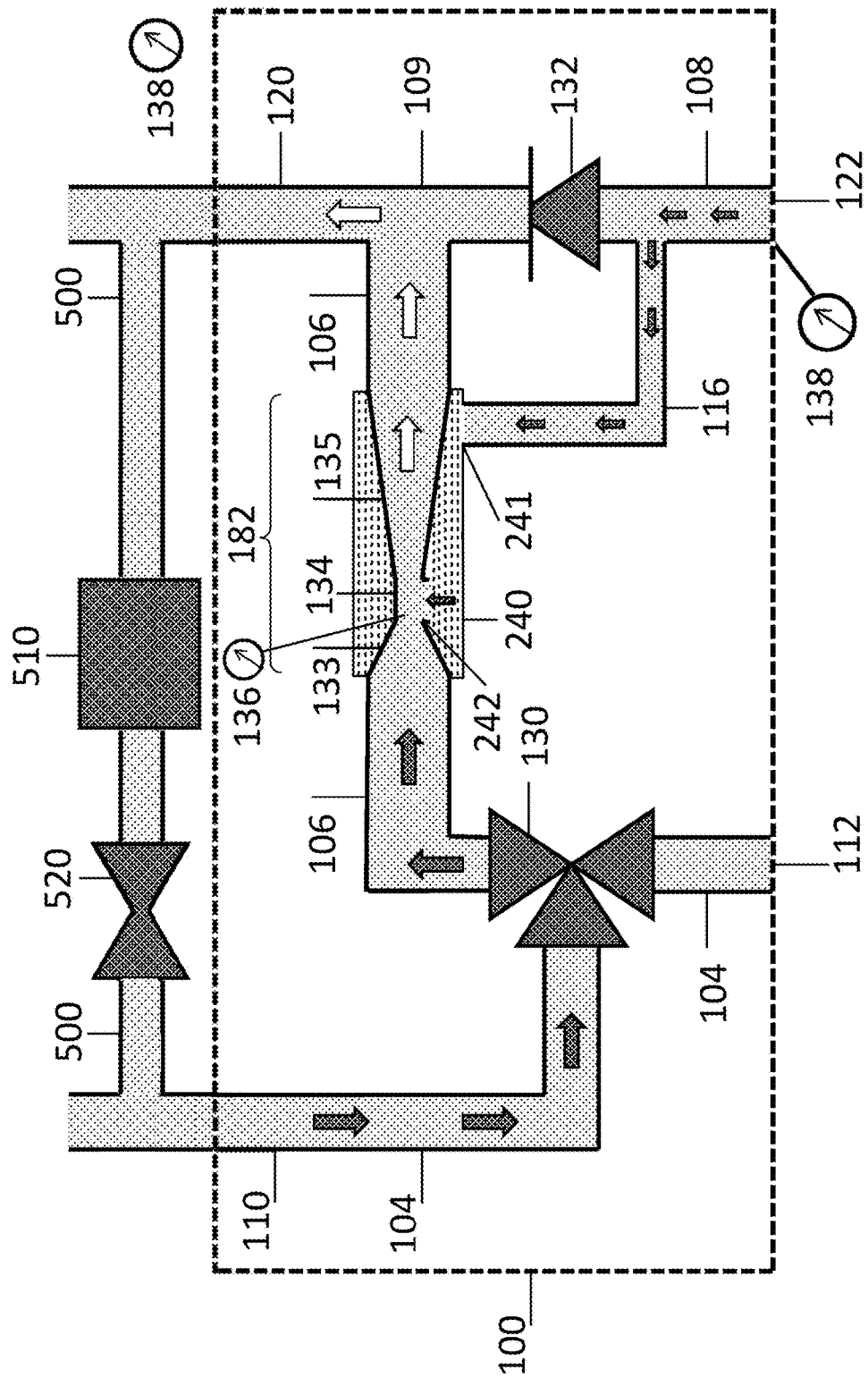
FIG. 3G is a further schematic of the coolant control apparatus shown in FIG. 3F, showing an ancillary shutoff valve disposed in the ancillary cooling circuit, according to the invention.

Referring now to FIGS. 3F and 3G, there is illustrated the coolant control apparatus 100 illustrated in FIG. 3A disposed in proximity to an ancillary cooling circuit 500 with an ancillary device 510 in communication therewith disposed therein. As illustrated in FIG. 3F, the apparatus 100 neither supplies liquid coolant to the ancillary device 510, nor extracts liquid coolant from the device 510.

As also illustrated in FIG. 3F, the ancillary cooling circuit 500 is coupled to the source inlet 110 and the exhaust outlet 120.

As illustrated in FIG. 3F, when liquid coolant flows through the bypass passageway 106, an ancillary coolant flow 530 also passes through the ancillary cooling circuit 500 and ancillary device 510. According to the invention, the ancillary coolant flow 530 detracts from the volume of coolant flow 140 passing through the bypass passageway 106, which can cause the pressure difference between the low-pressure zone 136 and the atmospheric pressure 138 to be diminished, resulting in reduced suction flow 142.

According to the invention, the reduction in the pressure difference between the low-pressure zone 136 and the atmospheric pressure 130 can be eliminated by closing an ancillary shutoff valve 520 disposed in the ancillary cooling circuit 500, either upstream, as illustrated in FIG. 3G, or downstream of the ancillary device 510.

Control of the ancillary shutoff valve 520 can be timed in conjunction with the actuation of the three-way control valve 130 such that when liquid coolant is directed to the supply outlet 112 for delivery to an external device, such as device 300 illustrated in FIG. 1, the ancillary shutoff valve 520 is open, and when the liquid coolant is directed to the bypass passageway 106 the ancillary shutoff valve 520 is closed.

Figure 5:
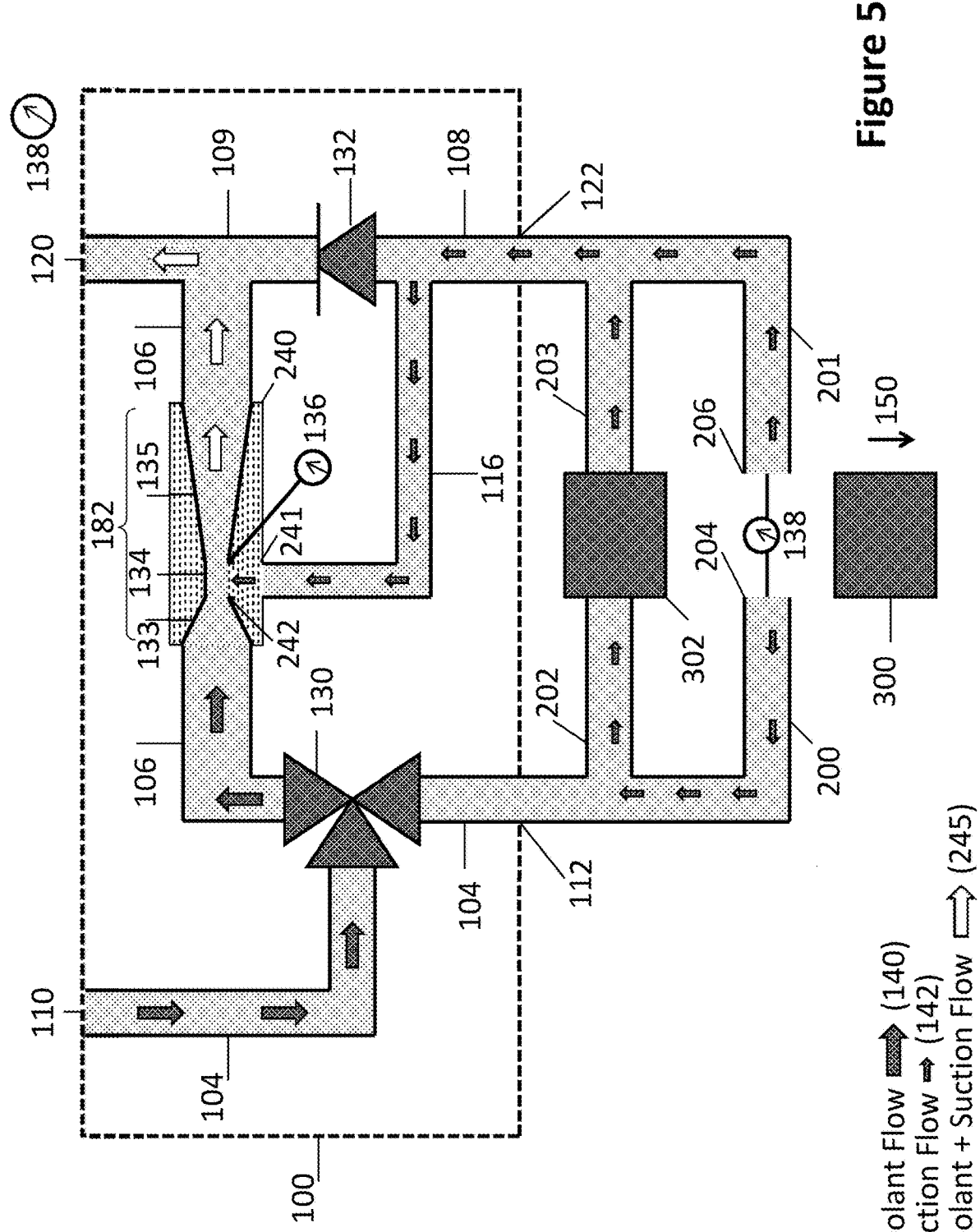
FIG. 5 is a schematic of an embodiment of a coolant control apparatus illustrating a suction flow of liquid coolant through a suction passageway when a first external device is detached and a parallel-coupled second external device remains coupled to the apparatus, according to the invention.

Referring now to FIG. 5, there is illustrated two external devices, wherein a first external device 300 is disposed between a first supply line 200 and a first return line 201, and a second external device 302 is disposed between a second supply line 202 and a second return line 203, with the first and second external devices 300, 302 and supply lines 200, 202 coupled in parallel between the supply coolant outlet 112 and return coolant inlet 122.

According to the invention, one or more openings, e.g., an upstream opening 204 in the first supply line 200, and a downstream opening 206 in the first return line 201, created by the detachment 150 of the first external device 300 from the first supply line 200 and the first return line 201, or alternately created by a break in the first supply line 200 or the second supply line 201, can occur without a significant leakage of the liquid coolant that can be contained in the first supply line 200 or the first return line 201.

As illustrated in FIG. 5, in some embodiments, the pressure difference between the low-pressure zone 136 and the atmospheric pressure 138 induces suction flow 142 of a portion of the liquid coolant contained in the first return line 201 to be drawn away from the downstream opening 206, while the second return line 203, the second external device 302 and the second supply line 202 provide a fluid coupling to the second low-pressure zone 136, which induces the suction flow 142 of a portion of the liquid coolant contained in the first supply line 200 to be drawn away from the upstream opening 204.

As further illustrated in FIG. 5, after the portion of the liquid coolant contained in the first supply line 200 is drawn away from the upstream opening 204, the pressure difference between the low-pressure zone 136 and the atmospheric pressure 138 also draws the portion of the liquid coolant contained in the first supply line 200 through the suction passageway 116 and into and through the fluid jacket 240, wherein the portion of the liquid coolant contained in the first supply line 200 is drawn into the bypass passageway 106 and combined with the liquid coolant flow 140 passing through the bypass passageway 106 to be discharged from the apparatus 100 through the exhaust passageway 109 and exhaust outlet 120.

Figure 6:
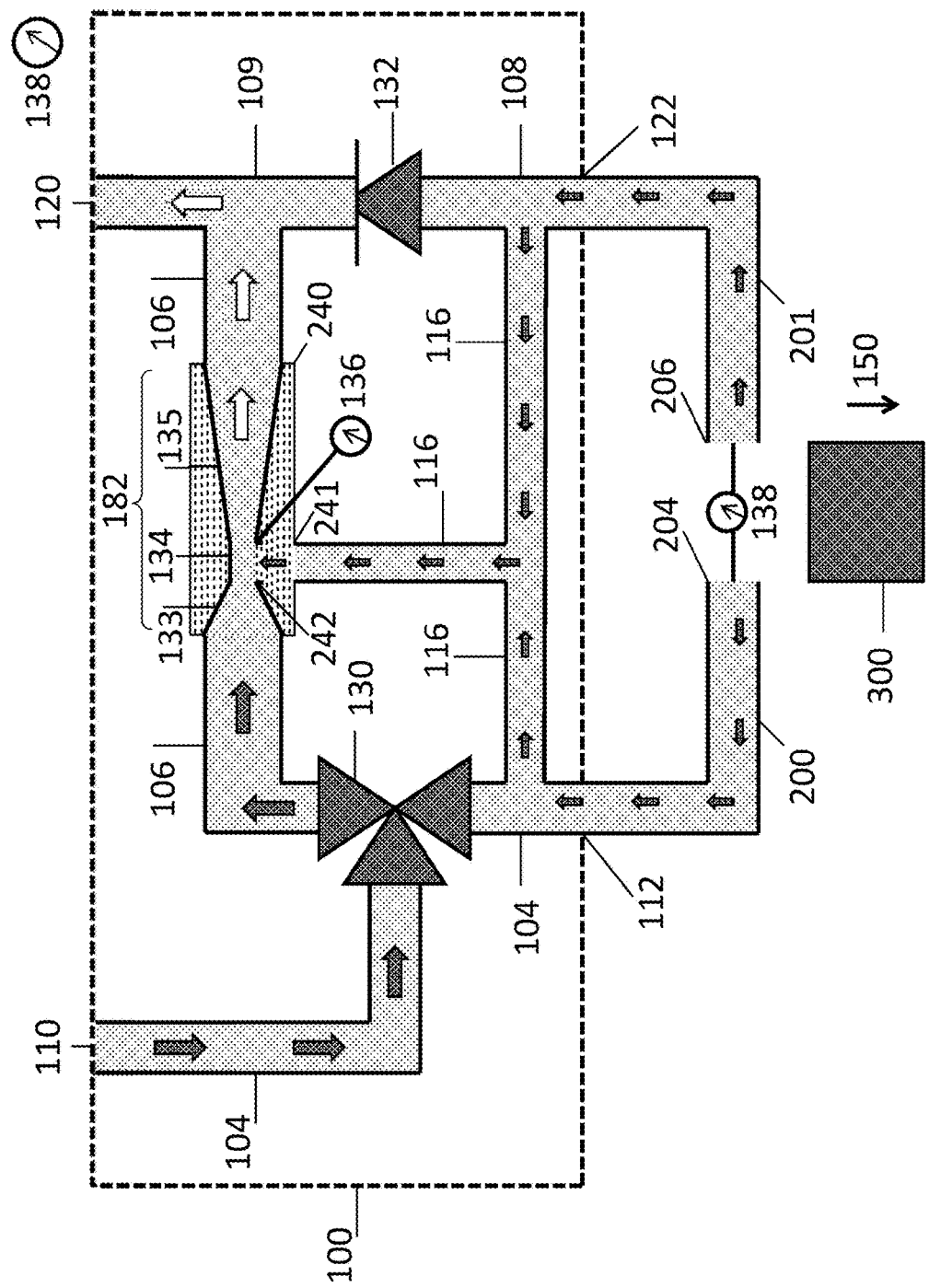
FIG. 6 is a schematic of an embodiment of a coolant control apparatus illustrating a suction flow path of liquid coolant through a suction passageway from both a supply passageway and a return passageway, according to the invention.

Referring now to FIG. 6, in some embodiments, when the coolant control apparatus 100 delivers the liquid coolant flow 140 to only the first external device 300, or to multiple external devices serially disposed between the first supply line 200 and the first return coolant line 201, the suction passageway 116 provides a common connection to both the supply passageway 104 and return passageway 108 to allow for a suction flow 142 from both the upstream opening 204 in the first supply line 200, or the downstream opening 206 in the first return line 201, when there is a pressure difference between the low-pressure zone 136 and the atmospheric pressure 138.

As illustrated in FIG. 6, the pressure difference between the low-pressure zone 136 and the atmospheric pressure 138 also draws the suction flow 142 through the suction passageway 116 and the fluid jacket 240, whereby the suction flow 142 is drawn into the bypass passageway 106 and combined with the liquid coolant flow 140 passing through the bypass passageway 106 to be discharged from the apparatus 100 through the exhaust passageway 109 and exhaust outlet 120.

Figure 7:
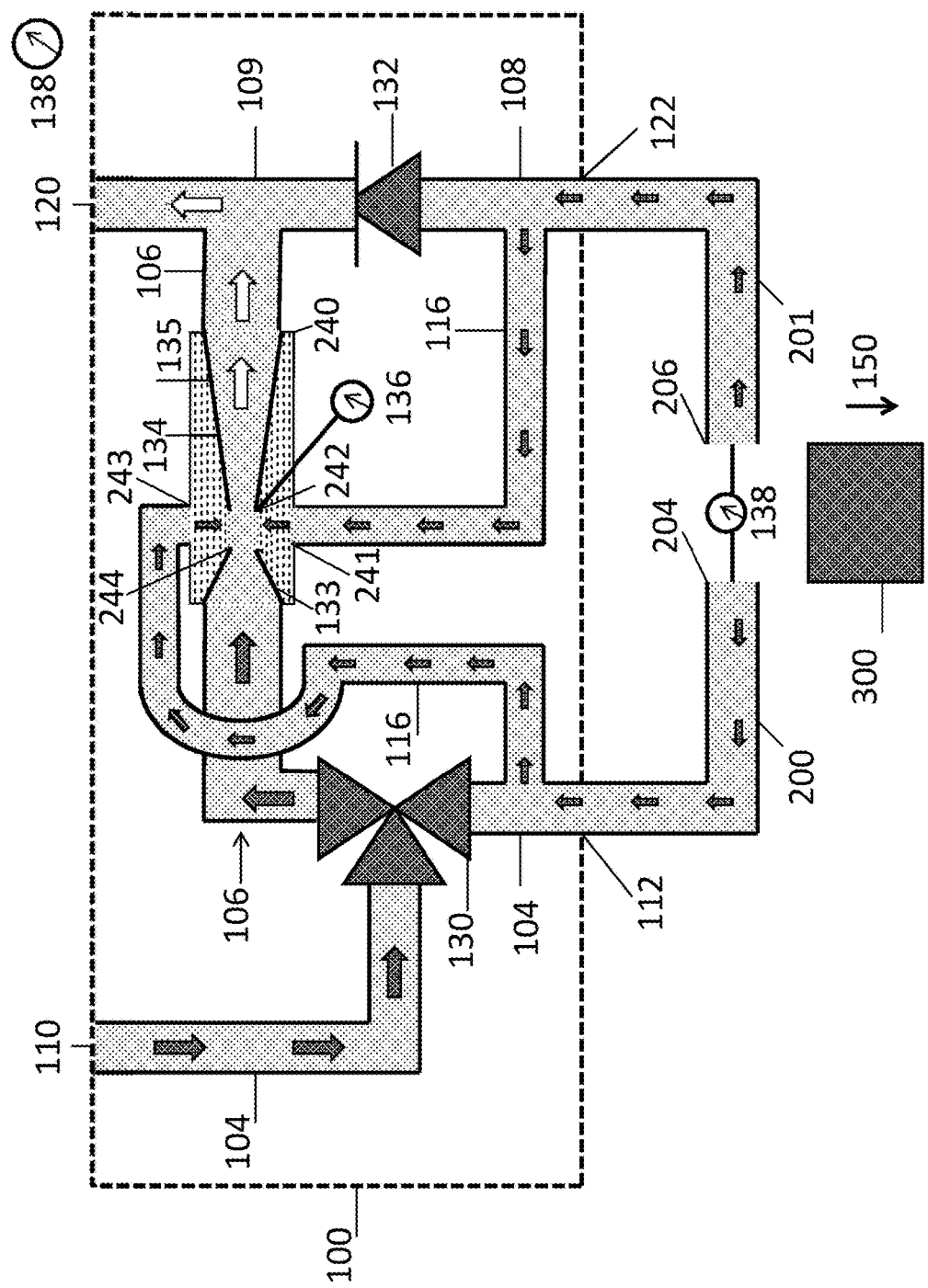
FIG. 7 is a schematic of an embodiment of a coolant control apparatus illustrating a suction flow of liquid coolant through a suction passageway coupled to a supply passageway and a second suction passageway coupled to a return passageway, according to the invention.

Referring now to FIG. 7, alternately, in some embodiments, the suction passageway 116 provides separate connections to the supply passageway 104 and return passageway 108.

As illustrated in FIG. 7, in the noted embodiments, the fluid jacket 240 would also comprise a second fluid jacket inlet 243 and can also comprise a second fluid jacket vacuum orifice 244.

Figure 8:
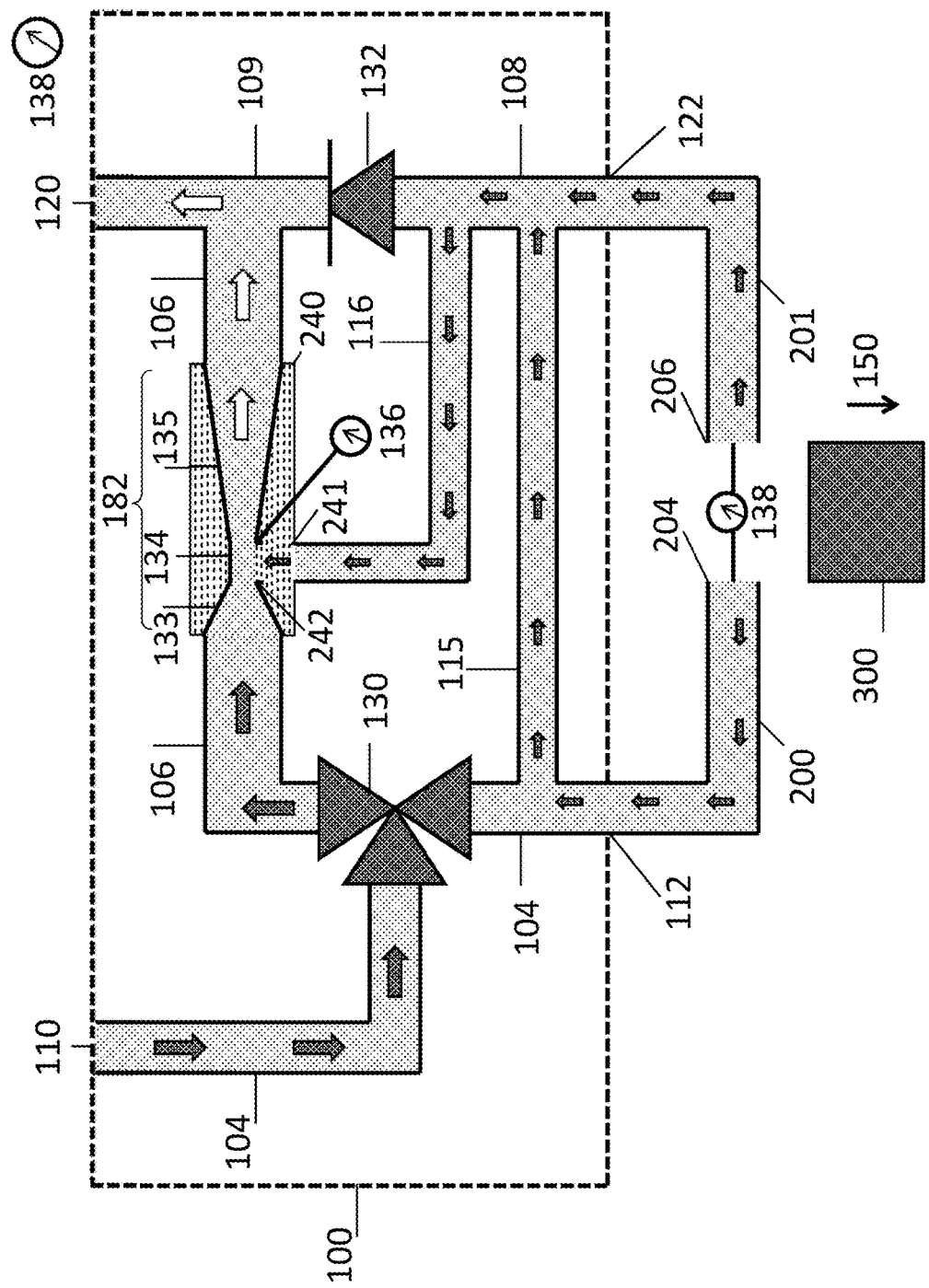
FIG. 8 is a schematic of an embodiment of a coolant control apparatus illustrating a suction flow path of liquid coolant through a parallel suction passageway coupling a supply passageway to a return passageway, according to the invention.

Referring now to FIG. 8, as set forth in Co-Pending Priority application Ser. No. 17/326,318, a third method of coupling the low-pressure zone 136 to the upstream opening 204 comprises providing a parallel passageway 115 within the apparatus 100 to provide a fluid coupling between the supply passageway 104 and the return passageway 108.

Figure 9:
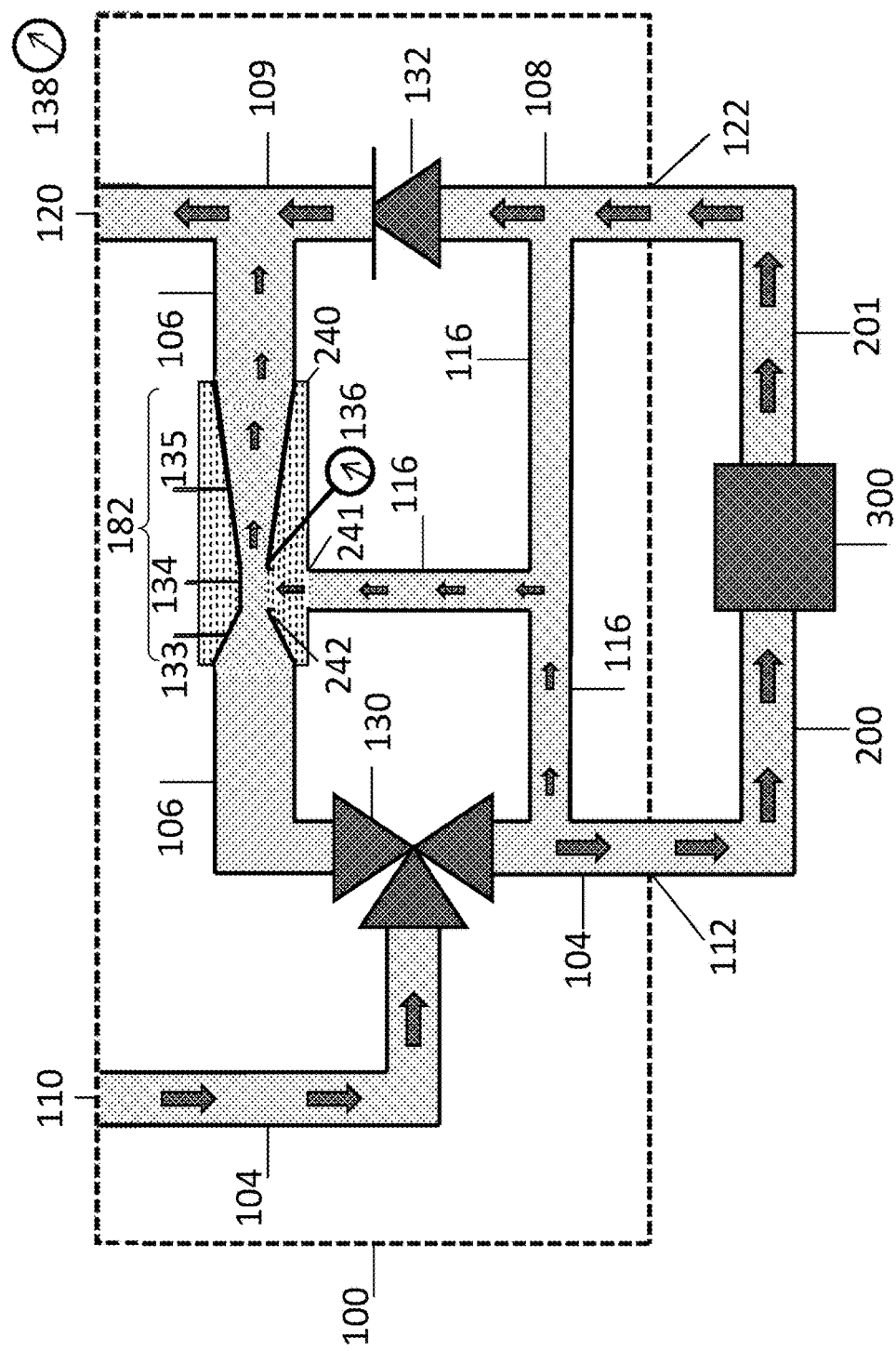
FIG. 9 is a schematic of an embodiment of a coolant control apparatus illustrating liquid coolant flow to an external device and incidental flow of liquid coolant through a suction passageway, according to the invention.

Referring now to FIG. 9, when the three-way valve 130 shuts off the liquid coolant flow 140 to the bypass passageway 106 and directs the liquid coolant flow 140 to the external device 300, an incidental flow 144 of the liquid coolant is allowed to pass through the suction passageway 116 to and through the fluid jacket 240, wherein the suction flow 142 is drawn into the bypass passageway 106 and combined with the liquid coolant flow 140 passing through the bypass passageway 106 and discharged from the apparatus 100 through the exhaust passageway 109 and exhaust outlet 120 when there is a sufficient pressure difference between the low-pressure zone 136 and the atmospheric pressure 138.

FIGS. 8 and 9 of Co-Pending Priority application Ser. No. 17/326,318 further illustrate how the incidental flow 144 can occur for the separate connection of the suction passageway 116 to the supply passageway 104, and for the parallel passageway 115, respectively.

Figure 10:
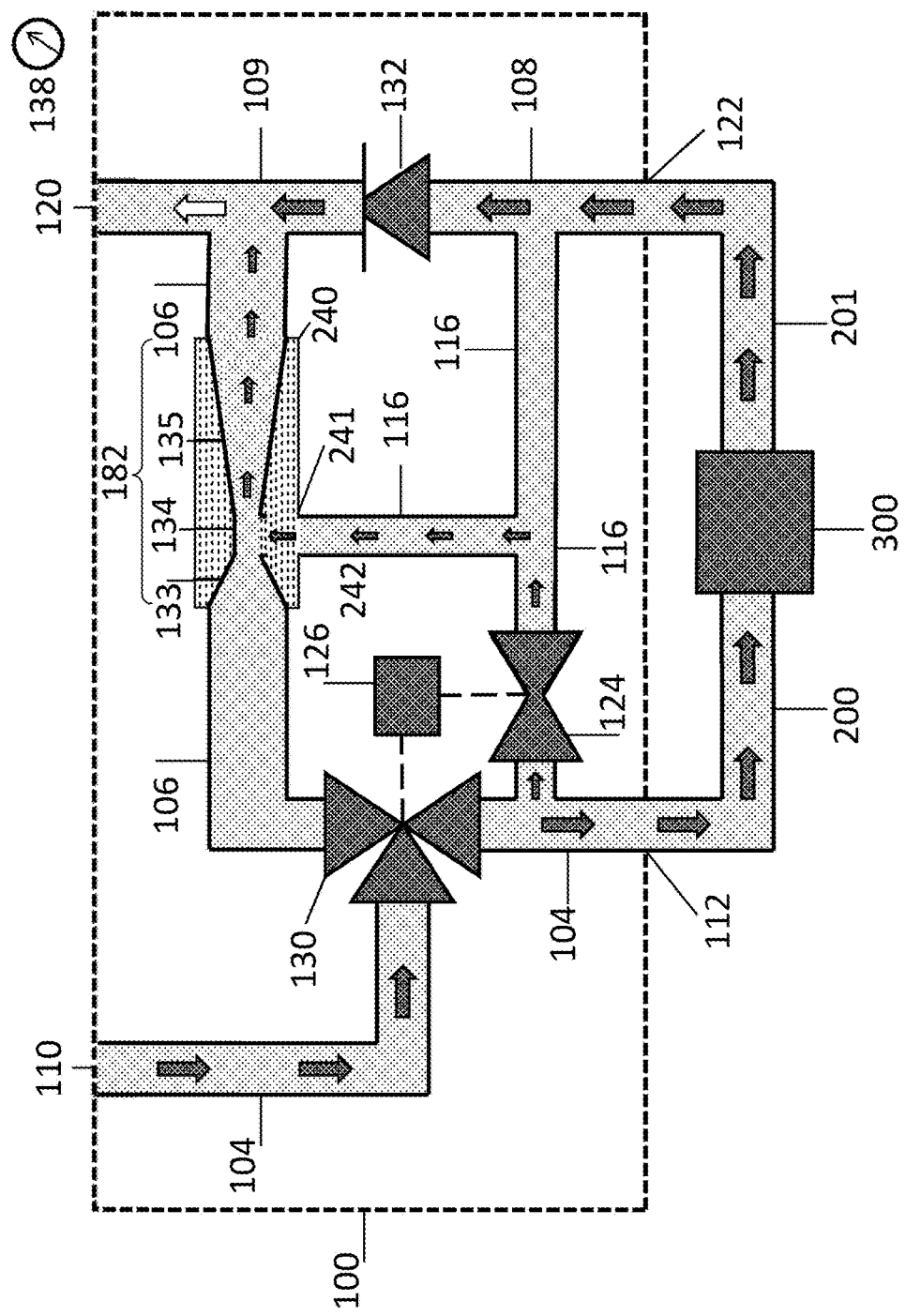
FIG. 10 is a schematic of an embodiment of a coolant control apparatus with a shutoff valve disposed in a suction passageway to abate incidental flow of liquid coolant from a supply passageway through the suction passageway when shut off, according to the invention.

Referring now to FIG. 10, as also set forth in Co-Pending Priority application Ser. No. 17/326,318, if the incidental flow 144 of the liquid coolant from the supply passageway 104 to the exhaust outlet 120 is undesired for a certain application, a shutoff valve 124 can be disposed in the suction passageway 116. According to the invention, when the three-way valve 130 shuts off the coolant flow 140 to the bypass passageway 106, the shutoff valve 124 can correspondingly stop or significantly reduce the incidental flow 144 of the liquid coolant through the suction passageway 116 and, thereby, into and through the fluid jacket 240, wherein the incidental flow 144 would be combined with the coolant flow 246.

Figure 11:
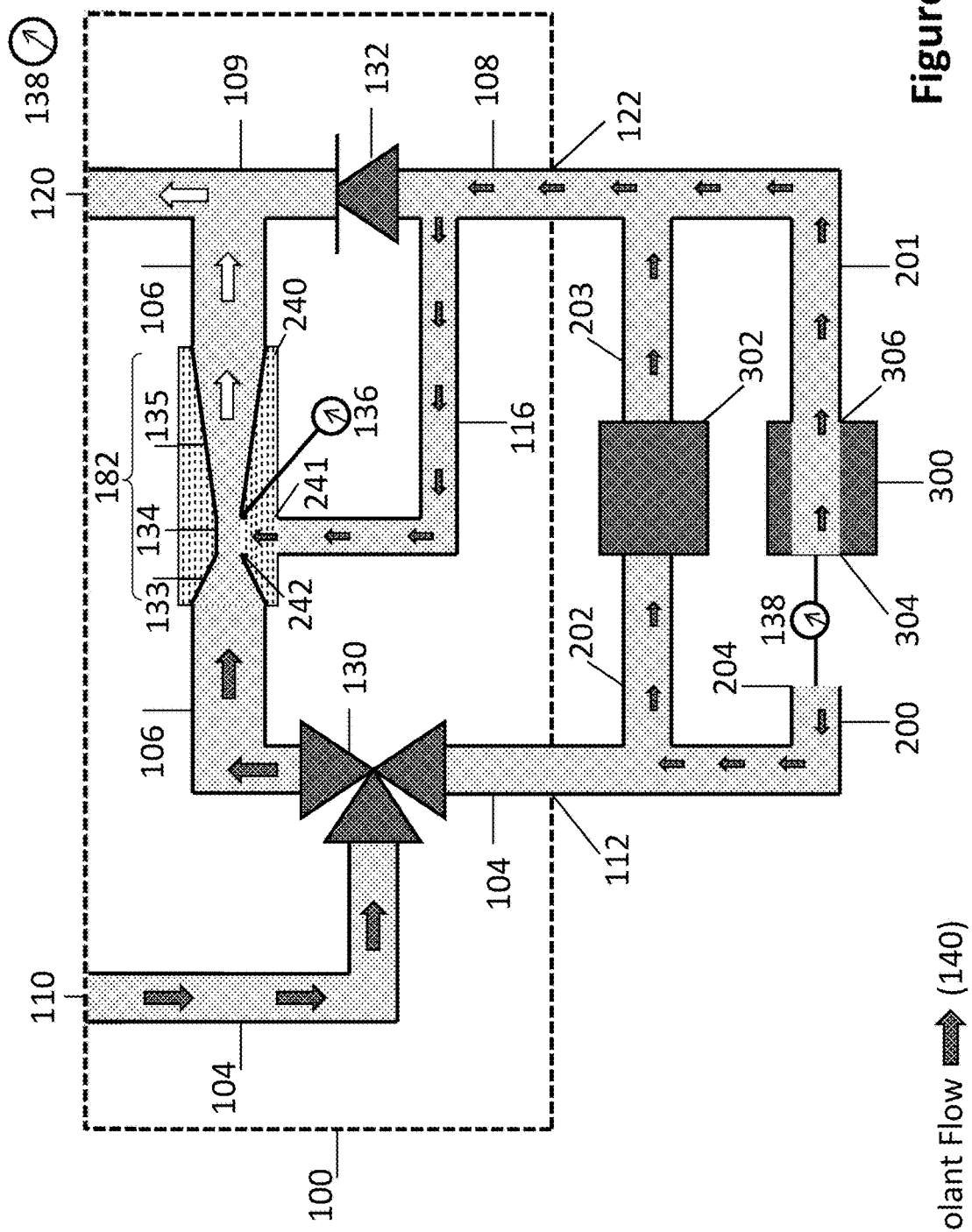
FIG. 11 is a schematic of an embodiment of a coolant control apparatus with the inlet of a first external device detached from a first supply line, illustrating the resulting suction flow path through a second external device evacuating at least a portion of the liquid coolant away from the first external device, according to the invention.
Figure 12:
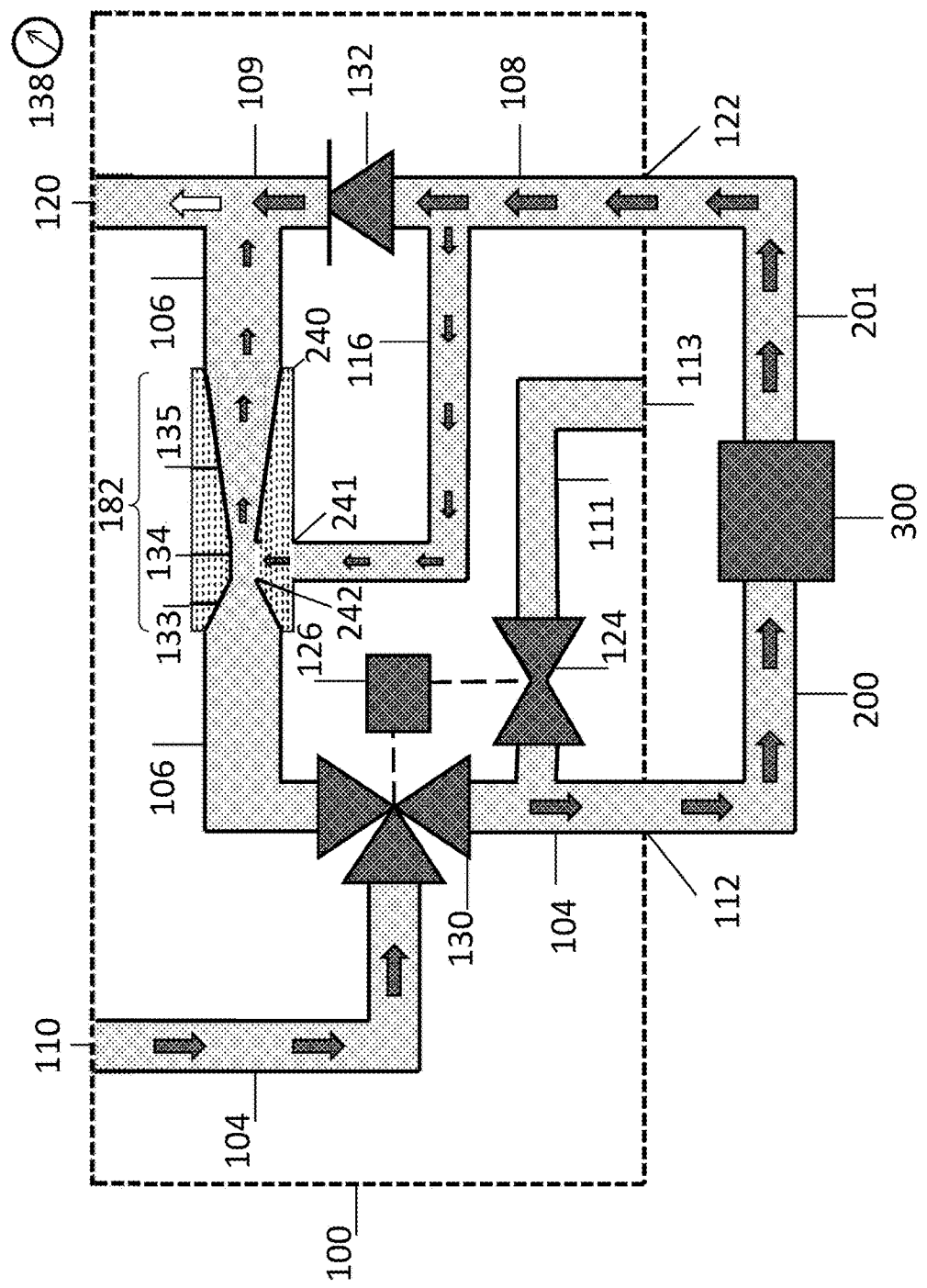
FIG. 12 is a schematic of an embodiment of a coolant control apparatus illustrating liquid coolant flow to an external device, with a shutoff valve preventing the liquid coolant flow from escaping the apparatus through a vent passageway, according to the invention.

FIGS. 11 and 12 of Co-Pending Priority application Ser. No. 17/326,318 illustrate how the shutoff valve 124 can be disposed for the separate connection of the suction passageway 116 to the supply passageway 104, and for the parallel passageway 115, respectively. As set forth in Co-Pending Priority application Ser. No. 17/326,318, in any case, a single actuator 126 can be used to actuate both the three-way valve 130 and the shutoff valve 124.

As also set forth in Co-Pending Priority application Ser. No. 17/326,318, the means of actuation for either or both valves could be (i) linear movement (e.g., a linear pneumatic, hydraulic, solenoid electrical actuator, etc.) or (ii) circular, rotational movement (e.g., a digital or analog motor drive, etc.). The means include manual operation, automated microcontroller operation of a mechanical or electrical motive force, or re-purposed robotic motion.

The routine detachment of the external device is required in certain applications. In some of these applications, the volume of liquid coolant contained within the external device is relatively small, and the potential leakage of the residual liquid coolant from the external device, once removed from the coolant lines, may be of little concern. But in other applications the volume of liquid coolant contained within the external device can be large enough that the potential leakage of the residual liquid coolant from the external device, when removed from the coolant line, may be of some consequence.

Referring now to FIG. 11, as set forth in Co-Pending Priority application Ser. No. 17/326,318, in order to limit the amount of the residual liquid coolant that can be lost from the first external device 300, when detached from the first supply line 200 and the first return line 201, the first supply line 200 can be detached from a first connection 304 of the first external device 300 before the first return line 201 is detached from a second connection 306, and a certain period of time allowed for the suction flow 142 to evacuate a portion of the liquid coolant from the first external device 300 before the first return line 200 is detached from the second connection 306. Conversely, the first return line 201 can be detached from the second connection 306 before the first supply line 200 is detached from the first connection 304.

Figure 13:
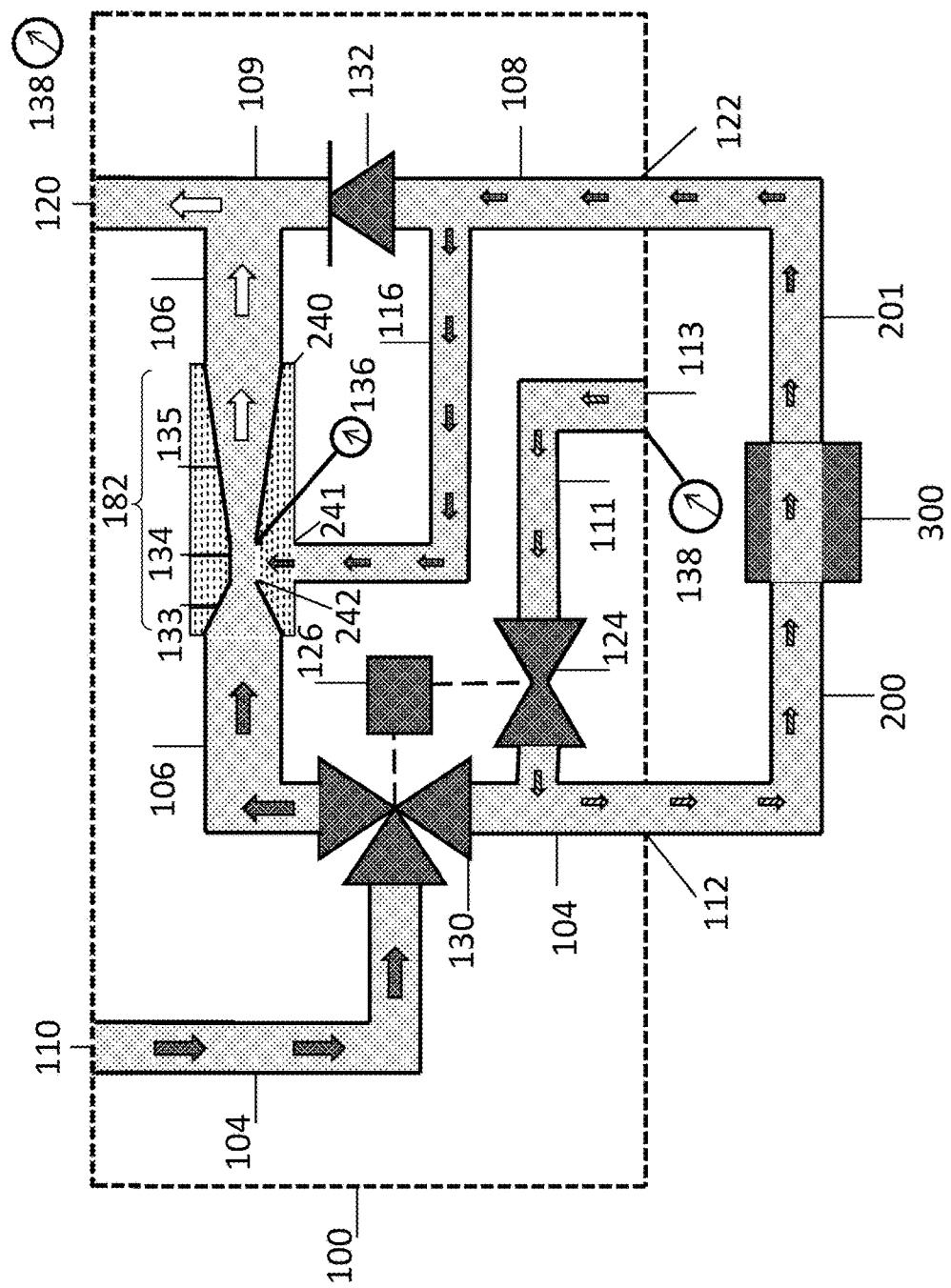
FIG. 13 is a schematic of an embodiment of a coolant control apparatus with the shutoff valve open, illustrating a suction flow path and an air flow path vented by a vent passageway to atmospheric pressure, according to the invention.

FIGS. 12 and 13 illustrate an alternative method for the apparatus 100 to remove a portion of the liquid coolant from the first external device 300 before detachment from the first supply line 200 and the first return line 201, wherein the apparatus 100 comprises include a vent passageway 111 to provide a fluid communication between the supply passageway 104 and the atmospheric pressure 138 at a vent inlet 113.

FIG. 12 illustrates the shutoff valve 124 disposed in the vent passageway 111, with the shutoff valve 124 stopping the coolant flow 140 from escaping through the vent inlet 113 as the liquid coolant is being delivered to the external device 300.

FIG. 13 illustrates the shutoff valve 124 disposed in the vent passageway 111, with the shutoff valve 124 open to allow an air flow 146 from the vent inlet 113 to displace the liquid coolant as the suction flow 142 removes a portion of the liquid coolant from the first supply line 200 and the first external device 300.

As set forth in Co-Pending Priority application Ser. No. 17/326,318, after an initiation of the suction flow 142, a certain period can be allowed for a portion of the liquid coolant to be evacuated from the first supply line 200 and the first external device 300, before the detachment of the first external device 300 from the first supply line 200 and the first return line 201.

As also set forth in Co-Pending Priority application Ser. No. 17/326,318, when disposed in the vent passageway 111, the shutoff valve 124 can be actuated by the same valve actuator 126 as the three-way valve 130. However, in the case of the shutoff valve 124 in the vent passageway 111, care should be exercised in sequencing the actuation of the shutoff valve 124 and the three-way valve 130 to ensure a sufficient period of time for the coolant flow 140 through the fluid restriction 134 to generate a low-pressure zone 136 lower than the atmospheric pressure 138 in order to relieve a fluid pressure of the liquid coolant in the supply passageway 104 higher than the atmospheric pressure 138 before opening the shutoff valve 124.

Conversely, the shutoff valve 124 should be closed before the three-way valve 130 is actuated to direct the flow of the liquid coolant to the first external device 300. These sequencing measures can prevent the liquid coolant from escaping the apparatus 100 through the vent inlet 113, which can occur if the shutoff valve 124 and the three-way valve 130 are actuated simultaneously.

Figure 14:
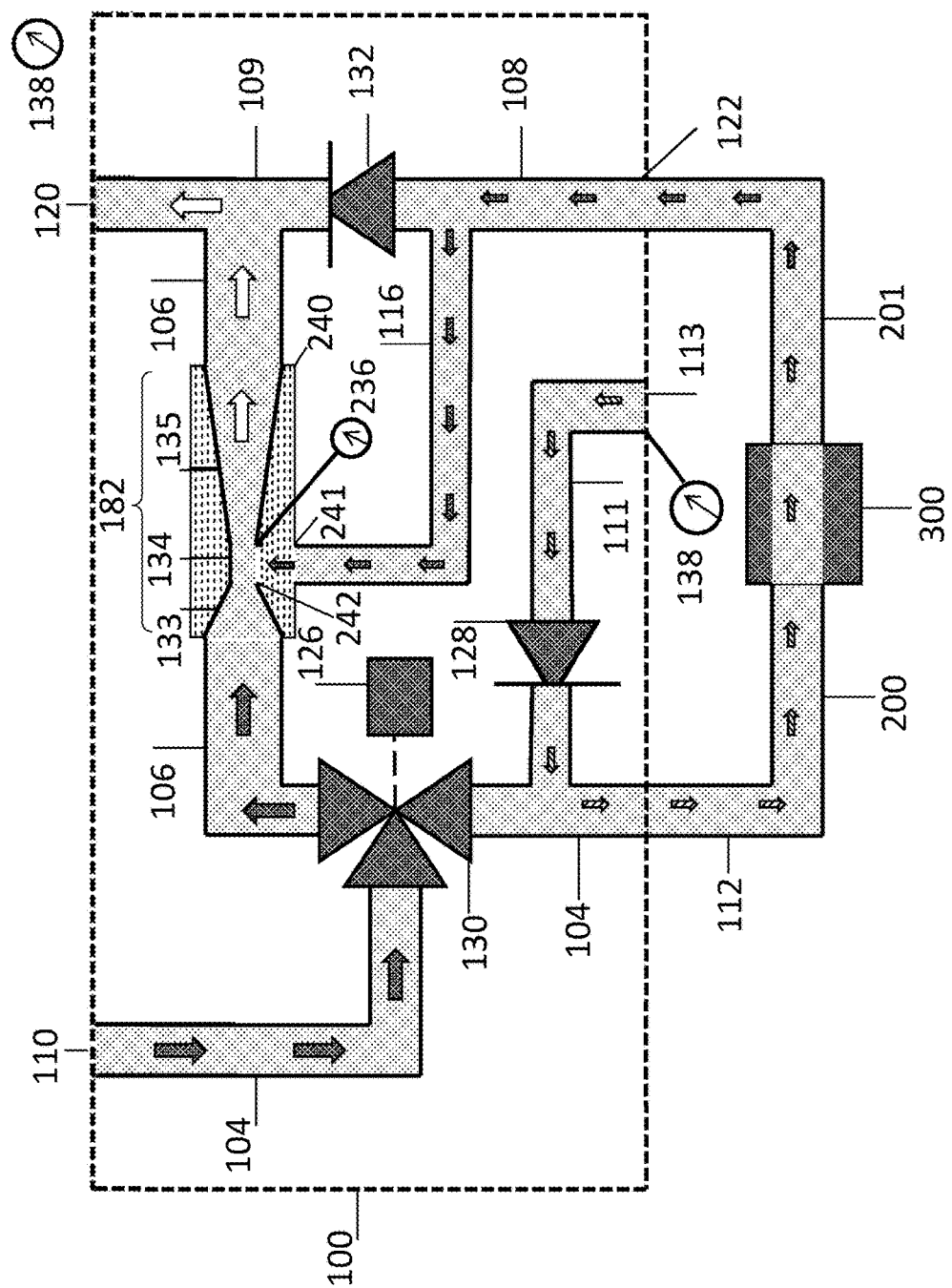
FIG. 14 is a schematic of an embodiment of a coolant control apparatus having a vent check valve in a vent passageway that allows airflow to displace a portion of the liquid coolant from a supply line and an external device, according to the invention.

Referring now to FIG. 14, to eliminate the need for valve sequencing, and thus simplify the apparatus 100, in some embodiments, a vent check valve 128 is disposed in the vent passageway 111 to allow the air flow 146 from the vent inlet 113 to displace the liquid coolant as the suction flow 142 removes a portion of the liquid coolant from the first supply line 200 and the first external device 300, while also stopping the coolant from escaping through the vent inlet 113. Again, a certain period can be allowed after initiating the suction flow 142 to ensure the evacuation of a portion of the liquid coolant from the first external device 300 before its detachment from the first supply line 200 and the first return line 201.

Figure 15:
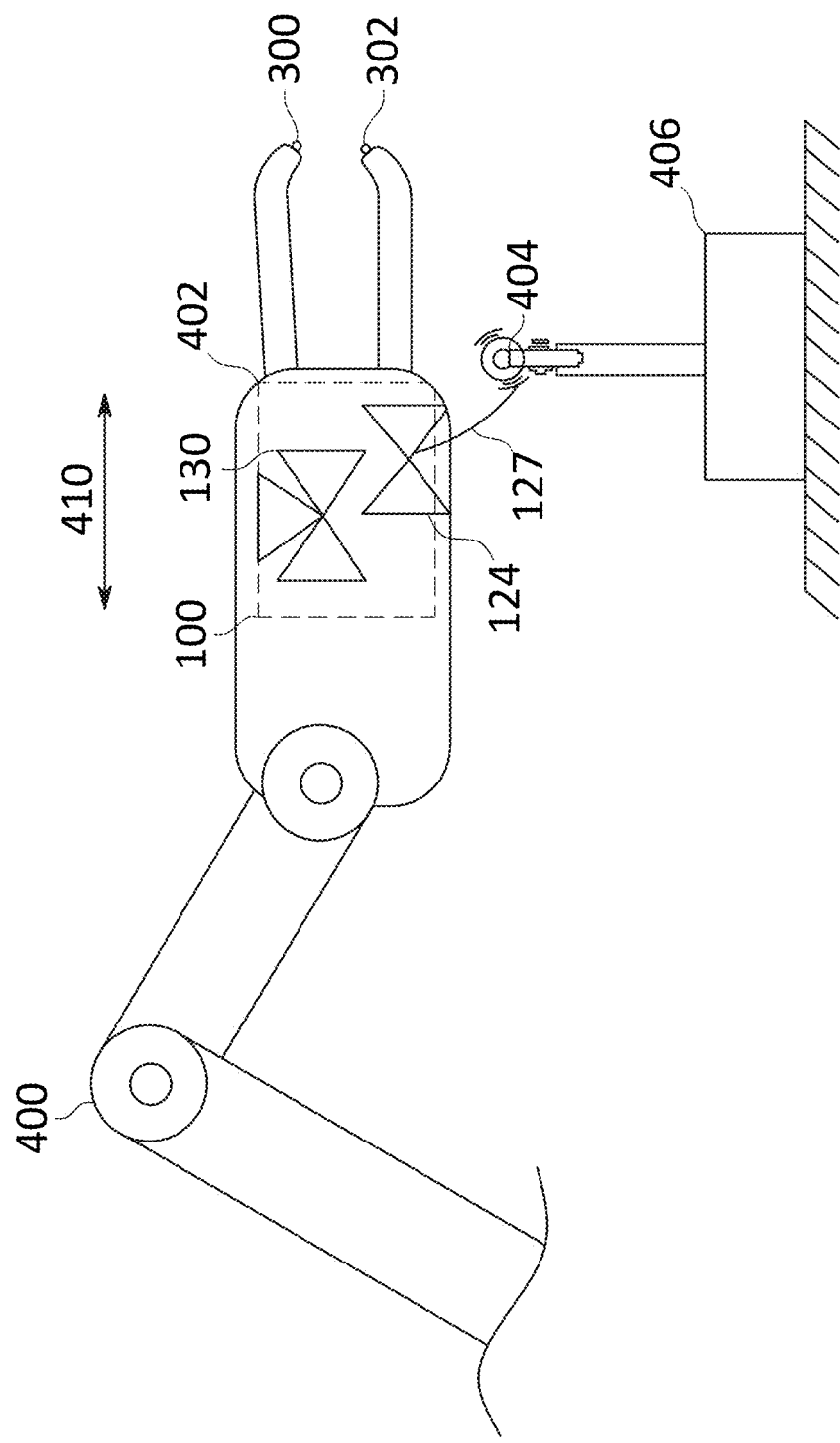
FIG. 15 is an illustration of a robot arm with a coolant control apparatus mounted on a welding apparatus coupled to the robot arm, with one or more valves being actuated by the motion of the robot arm, according to the invention.

As illustrated in FIG. 15, the first external device 300 and the second external device 302 can comprise the resistance welding electrodes of a welding apparatus 402 disposed on a robot arm 400.

As set forth in Co-Pending Priority application Ser. No. 17/326,318, a robotic motion 410 of the welding apparatus 402 can cause an actuator handle 127, to actuate the three-way valve 130, or the combination of both the three-way control valve and the shutoff valve 124, by an engagement of the actuator handle 127 with a handle stop 404, which can be mounted on a pedestal 406, or otherwise in proximity to the robot arm 400.

The noted reduction and simplification in the amount of equipment and infrastructure required to accomplish the actuation of valves means that no additional power source is required for the apparatus 100 to evacuate liquid coolant from the electrodes, making it extremely simple and low cost, as well as small and lightweight for practical mounting on the robot arm 400.

Figure 16A:
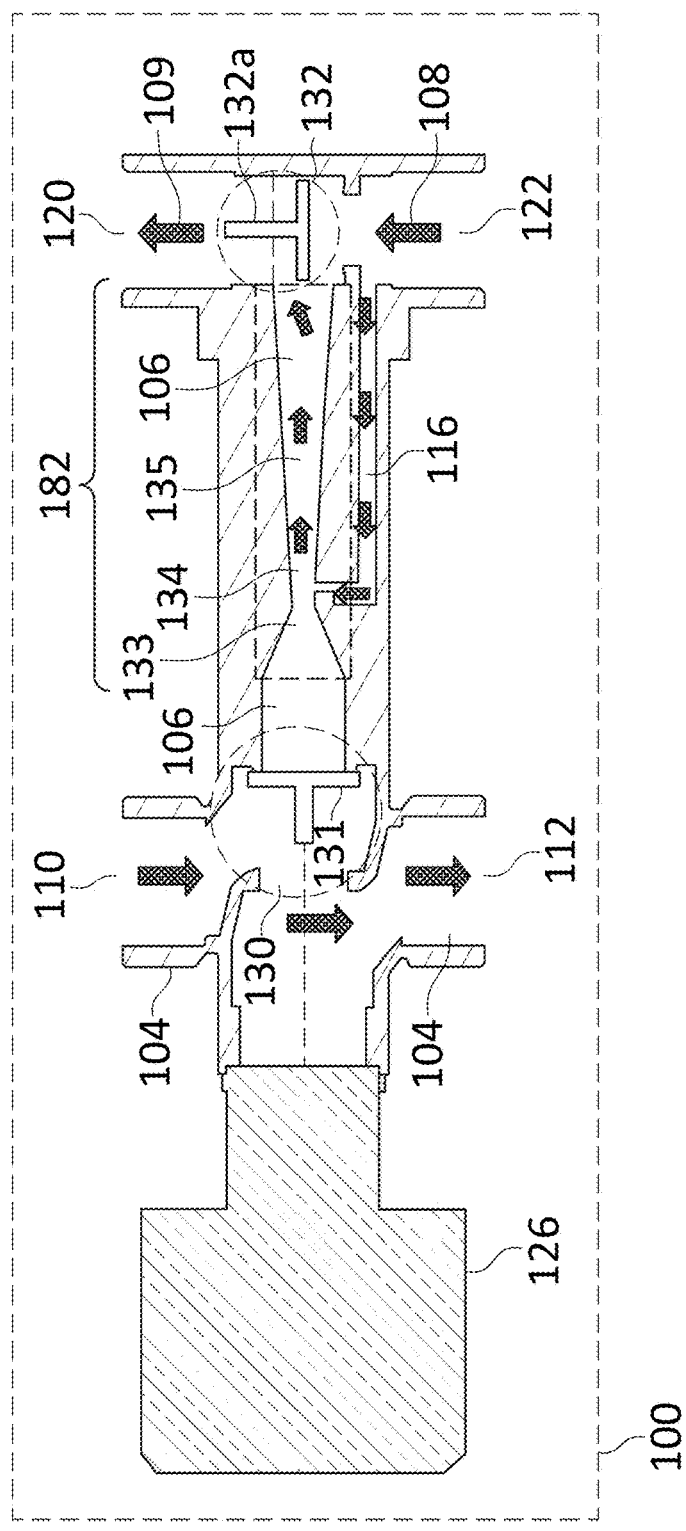
FIG. 16A is a cross-sectional view of a coolant control apparatus configured for external flow of coolant directed to an external fluid circuit with an external device (not shown), according to the invention.
Figure 16B:
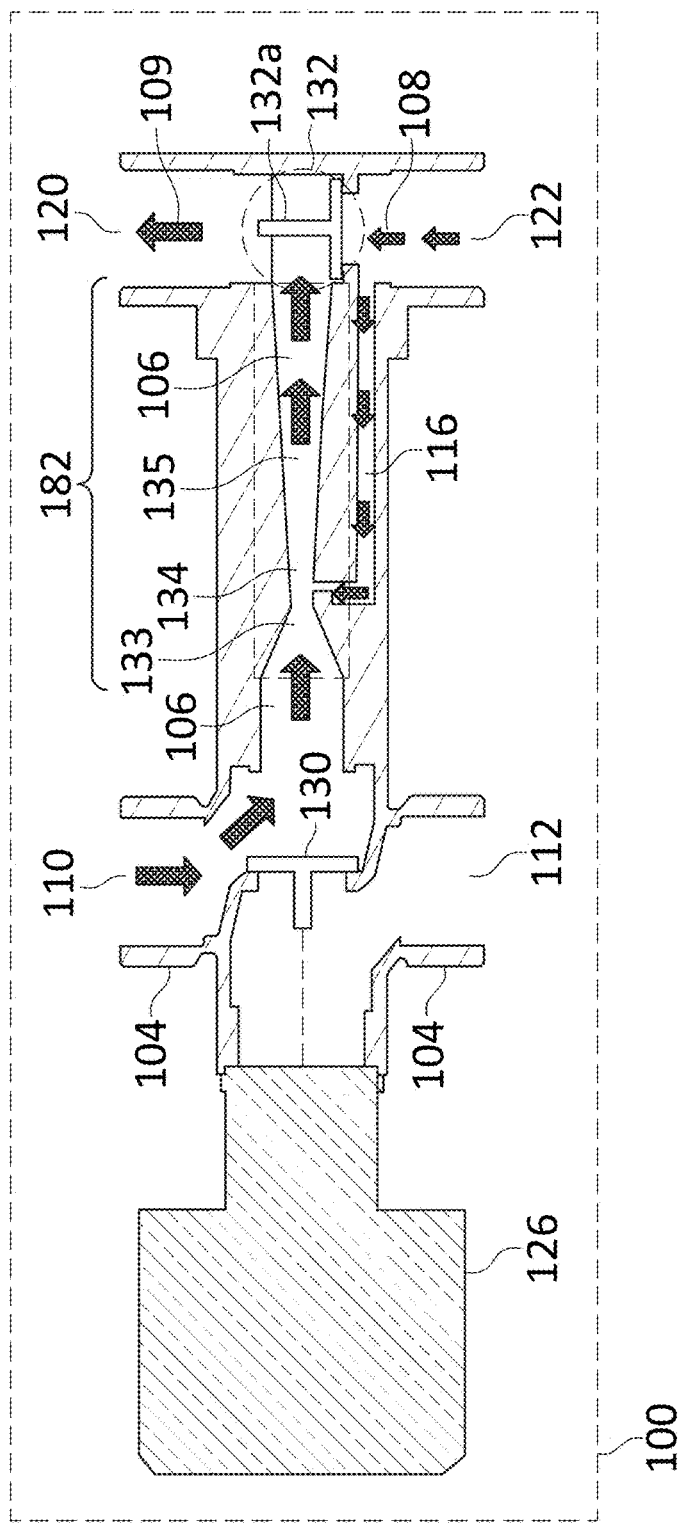
FIG. 16B is a cross-sectional view of a coolant control apparatus configured for bypass flow of coolant directed through a bypass passageway, according to the invention.

Referring now to FIGS. 16A and 16B, there are illustrated partial cross-sectional views of one possible embodiment of the coolant control apparatus 100 comprising a supply passageway 104, return passageway 108, exhaust passageway 109, suction passageway 116 and a venturi valve region 108.

As illustrated in FIGS. 16A and 16B, the apparatus 100 further comprises the control valve 130, which is coupled to the supply passageway 104 and bypass passageway 106, a valve actuator 126, which is in communication with the control valve 130, and the return check valve 132, which is coupled to the return passageway 108 and exhaust passageway 109.

As further illustrated in FIGS. 16A and 16B, the control valve 130 includes a valve diaphragm 131.

Referring now to FIG. 16A, the valve actuator 126 is adapted to hold the valve diaphragm 131 in a position where the control valve 130 directs the coolant flow 140 from the source inlet 110 to the supply outlet 112. After exiting the supply outlet 120, the coolant flow 140 is channeled through an external device (not shown) and returned to the return inlet 122, where the coolant flow 140 passes through the return check valve 132 and exits the apparatus 100 from the exhaust outlet 120.

As illustrated in FIG. 16B, the valve actuator 126 is further adapted to hold the valve diaphragm 131 in a position where the control valve 130 directs the coolant flow 140 through the bypass passageway 106.

As further illustrated in FIGS. 16A and 16B, in some embodiments, the return check valve 132 comprises a poppet 132a, which is adapted to allow a liquid coolant flow through the return passageway 108 and, thereby, through the exhaust passageway 109 when subjected to a coolant flow 140 from an external device, e.g., device 300, as shown in FIG. 16A, and prevent a backflow of liquid coolant from the exhaust passageway 109 to the return passageway 108 and return inlet 122, as illustrated in FIG. 16B.

Figure 16C:
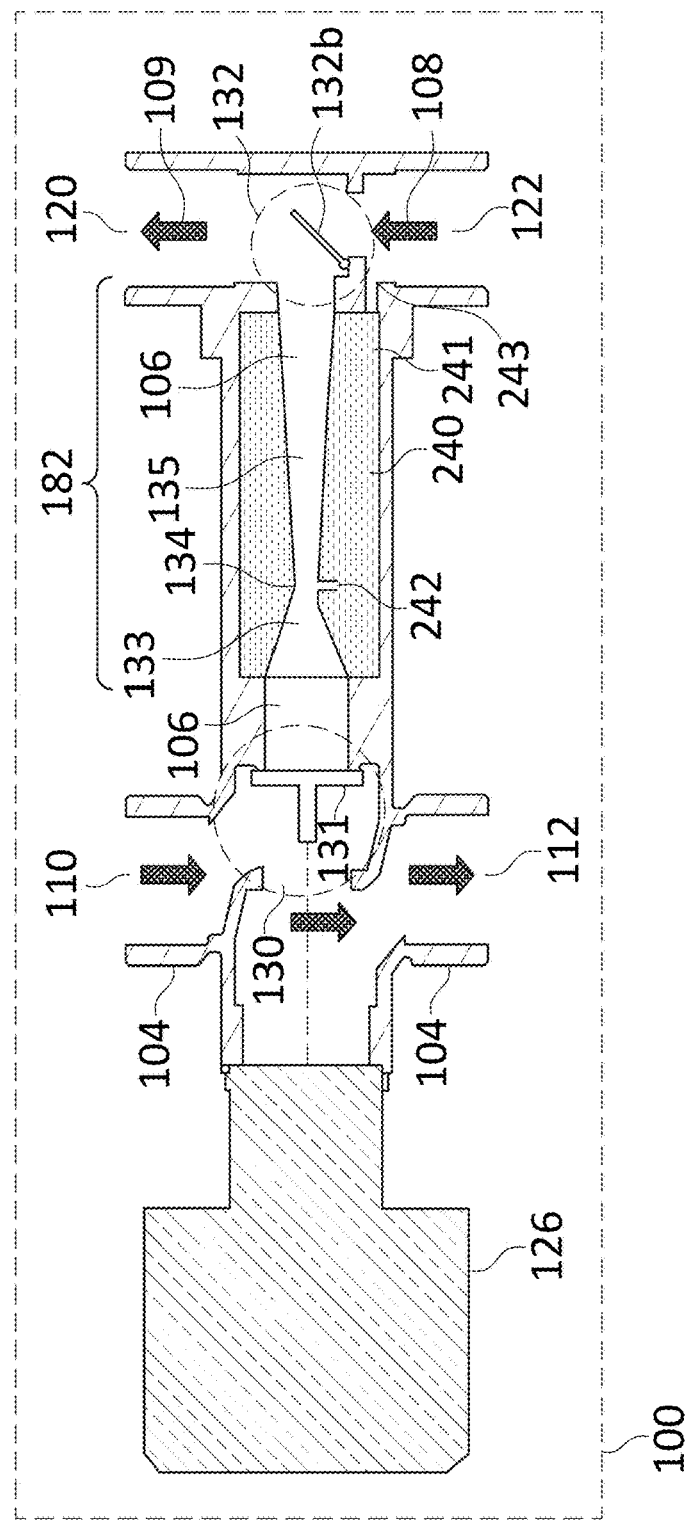
FIG. 16C is a cross-sectional view of another coolant control apparatus configured for external flow of coolant directed to an external fluid circuit with an external device (not shown), showing the return check valve of the apparatus in an open position that allows liquid coolant to flow through the return passageway and exhaust passageway, according to the invention.
Figure 16C:
Figure 16D:
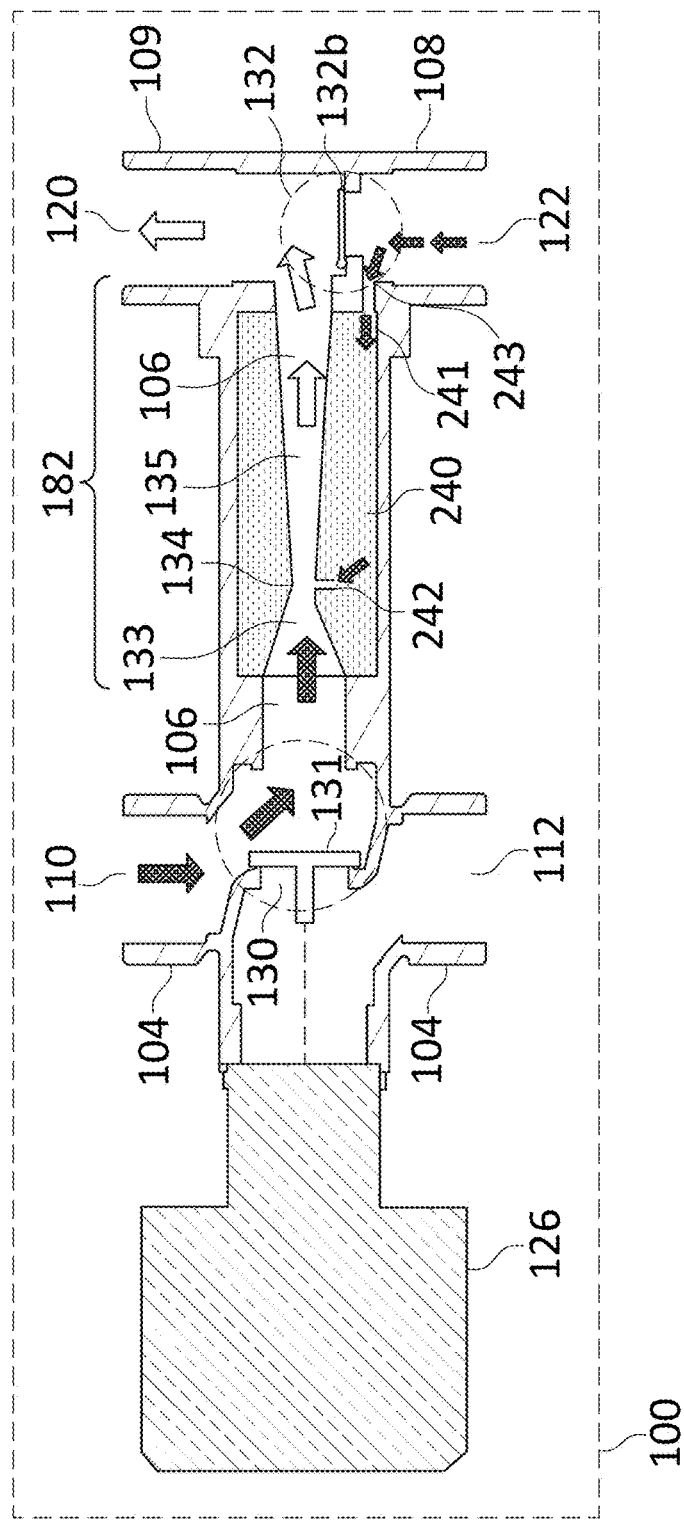
FIG. 16D is another cross-sectional view of the coolant control apparatus shown in FIG. 16C, showing the return check valve of the apparatus in closed position configuration that abates liquid coolant to flow into the return passageway, according to the invention.

Referring now to FIGS. 16C and 16D, there are illustrated partial cross-sectional views of another possible embodiment of the coolant control apparatus 100 illustrated in FIGS. 16A and 16B.

As illustrated in FIGS. 16C and 16D, in this embodiment, the return check valve 132 includes a hinged swing gate 132b, which is adapted to swing open to allow a liquid coolant flow through the return passageway 108 and, thereby, through the exhaust passageway 109 when subjected to a coolant flow 140 from an external device, e.g., device 300, as shown in FIG. 16C, and swing closed to prevent a backflow of liquid coolant from the exhaust passageway 109 to the return passageway 108 and return inlet 122, as illustrated in FIG. 16D.

Placement of the swing gate 132b in a position such that the liquid coolant flow through the bypass passageway 106 forces the swing gate to a closed position can eliminate the need for a closing spring as usually required for typical check valves.

Figure 17A:
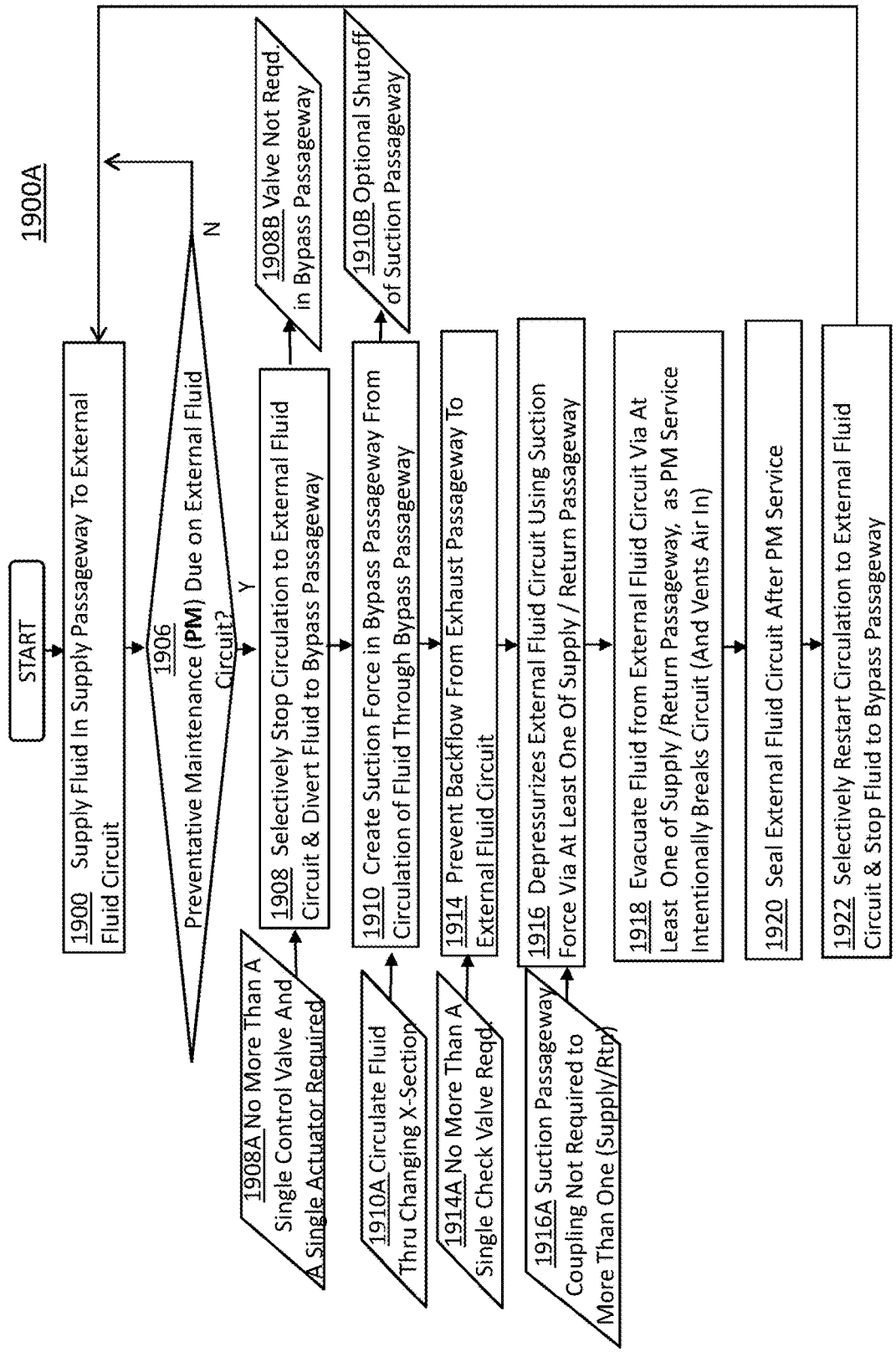
FIG. 17A is a flowchart of a method for controlling circulation of a fluid to, and an evacuation of the fluid from, an external fluid circuit undergoing preventative maintenance, according to the invention.
Figure 17B:
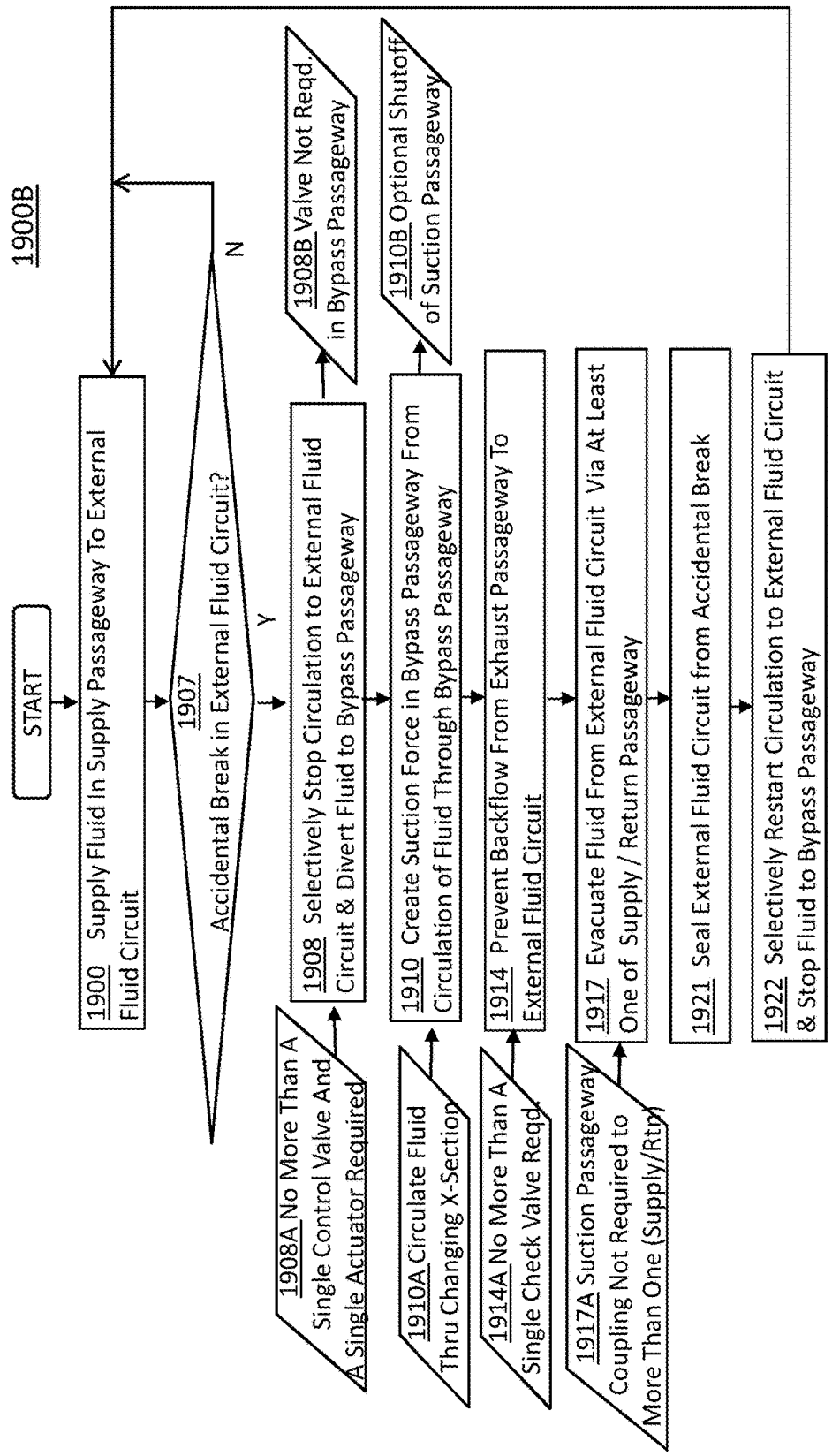
FIG. 17B is a flowchart of a method for controlling circulation of a fluid to, and an evacuation of the fluid from, an external fluid circuit experiencing an accidental break, according to the invention.

FIGS. 17A and 17B are flowcharts of methods to control circulation of a fluid to, and an evacuation of the fluid from, an external fluid circuit. Specifically, FIG. 17A is a flowchart 1900A of a method for controlling circulation of a fluid to, and an evacuation of the fluid from, an external fluid circuit undergoing preventative maintenance, according to one or more embodiments.

Operation 1900 supplies fluid in supply passageway 104 to external fluid circuit 101, e.g., as shown in FIG. 1, as external flow mode. Inquiry 1906 asks if preventative maintenance (PM) is due on external fluid circuit 101. If 'no', then the fluid supply operation 1900 continues unchanged per external flow mode, e.g., as shown in FIGS. 1 and 9. If 'yes', then operation 1908 selectively stops circulation of fluid to the external fluid circuit 101 (manually or via an automated actuator) and simultaneously diverts fluid to bypass passageway 106, in a bypass mode (aka, diverted or evacuation mode), e.g., as shown in FIGS. 2A-2C and 5-8.

By simultaneously performing both operations with no more than a single control valve and no more than a single actuator being required, per input 1908A, the present embodiment eliminates a possibility of malfunction or mistiming of two separate valves located apart from each other and/or in different branches of apparatus 100.

Per 1908B, it is noted that a valve is not required in bypass passageway 106 with the present embodiment, thus reducing cost, complexity, timing glitches, maintenance, failure events, etc.

Operation 1910 automatically creates a suction force in bypass passageway 106 from circulation of liquid coolant flow 140 through bypass passageway 106. Input 1910A notes the circulated liquid coolant flow through the coolant inlet 133 and coolant outlet 135 while output 1910B notes an optional shutoff 124 of suction passageways.

Operation 1914 simultaneously prevents backflow from exhaust passageway 109 to external fluid circuit 101. Input 1914A enables this with no more than a single check valve required, e.g., return check valve 132 shown in FIGS. 1 and 2B.

Operation 1916 depressurizes external fluid circuit 101 for the PM operation, presumably pressurized if there is no leak or break in the line. This operation occurs almost simultaneously in the bypass mode, since suction pressure arises and communicates quickly via incompressible fluid. Neither additional valve equipment nor separate operation is required for this step. Depressurizing external fluid circuit 101 prevents a burst or squirt of fluid occurring in an otherwise pressurized system that is disconnected. This is significant for applications with high-pressure fluid, or toxic fluid, or chilled/heated fluid.

Input 1916A beneficially notes a suction passageway coupling is not required to more than one of a supply passageway 104 or return passageway 108, e.g., as shown in FIGS. 1 and 2A-2C, with a single suction passageway 116, typically to return passageway 108. A suction passageway 116 coupling to only a supply passageway 104 is also feasible, though not illustrated herein.

Operation 1918 evacuates fluid from external fluid circuit 101 via at least one of supply passageway 104 or return passageway 108 at the point the PM Service intentionally breaks a line and allows air to vent in, thereby, evacuating fluid therefrom.

Operation 1920 presumes that after any PM work or repair/replacement was completed, external fluid circuit 101 is hermetically sealed and ready to reenter operation. Operation 1922 selectively restarts coolant flow 140 circulation to external fluid circuit 101 (external flow mode) and stops coolant flow 140 to bypass passageway 106, by the manual or actuator movement of control valve 130 to an appropriate position, which returns the flowchart operation 1900A back to operation 1900 start. Overall, the operation of flowchart 1900B, e.g., for apparatus 100, is streamlined, robust, safe, fast, error-proof, lean, and effective.

FIG. 17B is a flowchart 1900B of a method for controlling circulation of a fluid, e.g., liquid coolant, to, and evacuation of the fluid from, an external fluid circuit experiencing an accidental break, according to one or more embodiments.

Most of the operations in flowchart 1900B are substantially similar to those in flowchart 1900A, though flowchart 1900B is for an 'accidental break' in external fluid circuit that is then automatically depressurized, while flowchart 1900A is for a sealed external fluid circuit before the PM action breaks the line. Thus, only unique operations of flowchart 1900B (1907, 1917, and 1921) are discussed herein, with the remainder of descriptions for same-numbered operations being incorporated by reference from flowchart 1900A into the present flowchart.

Operation 1907 asks if an accidental break (or leak) arose on external fluid circuit 101. If 'no', then the fluid supply operation 1900 continues unchanged per external flow mode, e.g., as shown in FIG. 1. If 'yes', then operation 1908 selectively stops circulation of fluid (referred to herein after as "liquid coolant") to the external fluid circuit 101 (manually or via an automated actuator) and simultaneously diverts the liquid coolant to bypass passageway 106, in a bypass mode (aka, diverted or evacuation mode), e.g., as shown in FIGS. 2A-2C.

A leak can be a drip, or it can be an exigent situation as a ruptured line spraying a heated, toxic, slippery, and/or otherwise undesirable fluid. The latter condition being much more critical than a typical PM condition. Regardless, immediate remedy and mitigation is required.

By simultaneously performing both operations with no more than a single control valve and no more than a single actuator being required, per input 1908A, the present embodiment eliminates a possibility of potentially serious bodily harm or equipment damage. The present embodiment does so by eliminating conventional weaknesses that might consume more time, be less robust, and/or have higher probability of mis-operation arising from malfunction or mistiming of two separate valves located apart from each other and/or in different branches of apparatus 100.

Operation 1917 evacuates liquid coolant from external fluid circuit 101 via at least one of supply passageway 104 or return passageway 108 at the point the suction force becomes adequate to pull fluid from return passageway 108 and the rest of the external fluid circuit 101.

Granted, an accidental break in a coolant line might lead to a substantial amount of leakage in a worst-case scenario before a control valve can be actuated. However, at the point that the accident is apparent, a single simple operation 1908 is the only step required to remedy and mitigate the problem. Operation 1921 of sealing external fluid circuit 101 from the accidental break might require substantially more repairs and time than a PM Service, but the result of returning the system to operation is the same.

Overall flowchart 1900B provides a quicker and more robust solution to an accidental break in an external fluid circuit compared to prior art heat exchanger systems. While not described, the present flowchart contemplates an automatic detection system for abatement of a leakage incident. Such a detection system could provide a faster shutdown and evacuation operation.

Alternatives

In the foregoing specification, the invention has been described with reference to specific examples of embodiments of the invention. It will be evident, however, that various modifications and changes may be made therein without departing from the broader spirit and scope of the invention as set forth in the appended claims.

According to the invention methods and operations described herein can be in different sequences than the exemplary ones described herein, e.g., in a different order. Thus, one or more additional new operations may be inserted within the existing operations, or one or more operations may be abbreviated or eliminated, according to a given application.

The foregoing descriptions of specific embodiments of the present disclosure have been presented for purposes of illustration and description. They are not intended to be exhaustive or to limit the invention to the precise forms disclosed. Many modifications and variations are possible in light of the above teaching without departing from the broader spirit and scope of the various embodiments.

The embodiments were chosen and described in order to explain the principles of the invention and its practical application best and, thereby, to enable others skilled in the art to best utilize the invention and various embodiments with various modifications as are suited to the particular use contemplated.

It should also be appreciated that embodiments, as described herein, can be utilized or implemented alone or in combination with one another.

Advantages of the Inventions

As will readily be appreciated by one having ordinary skill in the art, the coolant control apparatus described herein provide numerous advantages compared to prior art heat exchanger systems and apparatus.

A major advantage is that, as indicated above, in a preferred embodiment, no more than a single control valve and a single check valve are required to control liquid coolant flow to and from an external device to be cooled.

The advantages realized thereby include minimized or reduced: part count; system cost; quantity of programming code/bugs; leak joints; operator training; and quantity and severity of failure modes, such as discrete valve failures or timing faults.

In addition, the coolant control apparatus are guaranteed to perform both operations (stopping and diverting liquid coolant flow) simultaneously and consistently for a given actuation, since the hardware to do so comprises a single physical item or component, i.e., a single ball valve with physical channels. Barring a catastrophic failure of the entire valve, successful fluid operations described herein for a given actuation are nearly identical, all things considered.

In comparison, conventional systems and apparatus utilizing multiple individual valves are subject to failure of an individual valve. Furthermore, individual valve operations must be sequenced and timed, which could lead to timing or mis-operation failures with one or more of the multiple valves.

One exemplary failure mode and effect analysis (FMEA) of a conventional architecture using separate valve include a failure of an accidental or premature opening of a separate bypass valve while a separate main supply remains open in a standard cooling configuration to the external fluid circuit. This short circuits the cooling path to the return line, thereby starving a fluid flow to a device to be cooled, and likely resulting in early failure of the device.

Another FMEA of the conventional architecture using separate valves is a failure to open a separate bypass valve after a separate main supply is closed, which could lead to a non-evacuated external fluid line with subsequent spillage and a resultant safety hazard, equipment damage, and lost productivity.

A further major advantage of the coolant control apparatus of the invention is that only actuation of a single valve is required to control operation of the systems.

Further, as indicated above, the coolant control apparatus include a venturi valve region that is disposed in the bypass passageway and adapted to create a low-pressure zone having a pressure of liquid coolant flowing therethrough that is less than an atmospheric pressure surrounding the system.

As further indicated above, in a preferred embodiment, the venturi valve region includes a fluid jacket that is adapted to encase at least the pressure modulating sections of the valve region.

The advantage realized by the fluid jacket is the unlimited position of the external suction connection in relation to the venturi valve.

A further major advantage realized by the fluid jacket is that downward positioning of the fluid jacket inlet and outlet (relative to the longitudinal axis of the bypass passageway) facilitates drainage of the liquid coolant from the venturi valve region and fluid jacket when the coolant control system is not in use. Thus, the fluid jacket substantially reduces the probability of damage to the venturi valve region and/or fluid jacket due to ice formation when the system is not in use and is subjected to freezing conditions.

The coolant control apparatus of the invention are also useful in multiple applications, including the following:
apparatus and systems that include a device or apparatus that utilizes a fluid flow for a function, such as cooling, e.g., spot welding tips, or heating, e.g., high-temperature plating, or other manufacturing processing, e.g., chemical vapor deposition;

apparatus and systems requiring evacuation of fluids for purposes of safety, cost, or convenience, such as apparatus and systems that include gas or liquids that are toxic or that create safety hazards when spilled; and equipment requiring frequent preventative maintenance (PM) of fluid circuits, or fluid circuits requiring substitution of fluid types, or critical equipment sensitive to leaks from an accidental break in the external fluid circuit, such as a resistance (spot) welding system, a semiconductor device, an electronic circuit, semiconductor fabrication equipment, etc.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. An apparatus for controlling circulation of a fluid to and from an external device for heat transfer, comprising;
    a supply inlet adapted to receive and transmit said fluid therethrough;
    a supply passageway coupled to said supply inlet;
    a bypass passageway coupled to said supply inlet, said bypass passageway comprising a venturi valve region adapted to create a suction force when said fluid flows therethrough, said venturi valve region comprising an inlet region, an outlet region and a restricted region disposed between said inlet region and said outlet region,
    said venturi valve region further comprising a fluid jacket, said fluid jacket configured to at least partially surround at least a portion of said venturi valve region, said fluid jacket adapted to receive said fluid therein,
    said fluid jacket comprising a fluid jacket inlet and a fluid jacket vacuum orifice, said fluid jacket vacuum orifice coupled to said restricted region of said venturi valve region;
    a control valve coupled to said supply inlet, said supply passageway and said bypass passageway, said control valve adapted to divert said fluid from said supply inlet into and through said supply passageway and, thereby, to said external device, and divert said fluid from said supply inlet into and through said bypass passageway and, thereby, into and through said venturi valve region, whereby said suction force is created by said venturi valve region;
    a return passageway coupled to said external device for receiving said fluid from said external device, said return passageway comprising first valve means for preventing a backflow of said fluid through said return passageway; and
    a suction passageway coupled to said return passageway and said fluid jacket inlet.

2. The apparatus of claim 1, wherein, when said venturi valve region creates said suction force, at least a first portion of said fluid in said return passageway is drawn from said return passageway, through said suction passageway and said fluid jacket, and into said bypass passageway and combined with said fluid flowing therethrough.

3. The apparatus of claim 1, wherein said inlet region of said venturi valve region comprises a first maximum diameter and said outlet region of said venturi valve region comprises a second maximum diameter.

4. The apparatus of claim 3, wherein said inlet region of said venturi valve region comprises a gradually decreasing cross-sectional area and said outlet region of said venturi valve region comprises a gradually increasing cross-sectional area, and said second maximum diameter of said outlet region does not exceed said first maximum diameter of said inlet region.

5. The apparatus of claim 1, wherein said fluid jacket inlet of said fluid jacket is positioned either radially or axially on said fluid jacket without regard to the position of said fluid jacket vacuum orifice.

6. The apparatus of claim 1, wherein said fluid jacket inlet and said fluid jacket vacuum orifice of said fluid jacket are positioned in a downward direction relative to a longitudinal axis of the bypass passageway.

7. The apparatus of claim 1, wherein said system further comprises an exhaust passageway, said exhaust passageway coupled to said bypass passageway and said return passageway.

8. The apparatus of claim 1, wherein said first valve means comprises a swing gate adapted to transition to an open position when subjected to a first flow of said fluid through said return passageway, wherein said swing gate allows said first flow of said fluid through said return passageway to flow into and through said exhaust passageway, and transition from said open position to a closed position as forced by a second flow of said fluid passing through said bypass passageway obliquely striking said swing gate while in said open position without any need for other closing means such as a mechanical spring, wherein said swing gate thus forced to said closed position prevents a backflow of said fluid in said second fluid flow into said return passageway.

9. The apparatus of claim 1, wherein said suction passageway comprises second valve means for preventing backflow of said fluid through said suction passageway.

10. The apparatus of claim 1, wherein no other valve is disposed in said supply passageway or said bypass passageway apart from said control valve.

11. The apparatus of claim 1, wherein said coupling of said fluid jacket vacuum orifice to said restricted region of said venturi valve region does not require an annular groove to couple said suction force generated by said venturi valve region to said fluid jacket.

12. A system for controlling circulation of a fluid to and from an external device for heat transfer, comprising:
an external fluid circuit coupled to said system and said external device;
a supply inlet adapted to receive and transmit said fluid therethrough;
a supply passageway coupled to said supply inlet and said external fluid circuit;
a bypass passageway coupled to said supply inlet, said bypass passageway comprising a venturi valve region adapted to create a suction force when said fluid flows therethrough, said venturi valve region comprising an inlet region, an outlet region and a restricted region disposed between said inlet region and said outlet region,
said venturi valve region further comprising a fluid jacket, said fluid jacket configured to at least partially surround at least a portion of said venturi valve region, said fluid jacket adapted to receive said fluid therein,
said fluid jacket comprising a fluid jacket inlet and a fluid jacket vacuum orifice, said fluid jacket vacuum orifice coupled to said restricted region of said venturi valve region;
a control valve coupled to said supply inlet, said supply passageway and said bypass passageway, said control valve adapted to divert said fluid from said supply inlet into and through said supply passageway and, thereby, into said external fluid circuit, and divert said fluid from said supply inlet into and through said bypass passageway and, thereby, into and through said venturi valve region, whereby said suction force is created by said venturi valve region;
a return passageway coupled to said external fluid circuit for receiving said fluid from said external device, said return passageway comprising valve means for preventing a backflow of said fluid through said return passageway; and
a suction passageway coupled to said supply passageway and said fluid jacket inlet.

13. The system of claim 12, wherein, when said venturi valve region creates said suction force, at least a first portion of said fluid in said supply passageway is drawn from said return passageway, through said suction passageway and said fluid jacket, and into said bypass passageway and combined with said fluid flowing therethrough.

14. The system of claim 12, wherein said inlet region of said venturi valve region comprises a first maximum diameter and said outlet region of said venturi valve region comprises a second maximum diameter.

15. The system of claim 12, wherein said inlet region of said venturi valve region comprises a gradually decreasing cross-sectional area and said outlet region of said venturi valve region comprises a gradually increasing cross-sectional area, and said second maximum diameter of said outlet region does not exceed said first maximum diameter of said inlet region.

16. The system of claim 12, wherein said fluid jacket inlet of said fluid jacket is positioned either radially or axially on said fluid jacket without regard to the position of said fluid jacket vacuum orifice.

17. The system of claim 12, wherein said fluid jacket inlet and said fluid jacket vacuum orifice of said fluid jacket are positioned in a downward direction relative to a longitudinal axis of the bypass passageway.

18. The system of claim 12, wherein said system further comprises an exhaust passageway, said exhaust passageway coupled to said bypass passageway and said return passageway.

19. The system of claim 18, wherein said first valve means comprises a swing gate adapted to transition to an open position when subjected to a third flow of said fluid through said return passageway, wherein said swing gate allows said third flow of said fluid through said return passageway to flow into and through said exhaust passageway, and transition from said open position to a closed position as forced by a fourth flow of said fluid passing through said bypass passageway obliquely striking said swing gate while in said open position without any need for other closing means such as a mechanical spring, wherein said swing gate thus forced to said closed position prevents a backflow of said fluid in said fourth fluid flow into said return passageway.

20. The system of claim 12, wherein said suction passageway comprises second valve means for preventing backflow of said fluid through said suction passageway.

21. The system of claim 12, wherein no other valve is disposed in said supply passageway, said external fluid circuit or said bypass passageway apart from said control valve.

22. The system of claim 12, wherein said coupling of said suction passageway to said fluid jacket inlet does not require an annular groove to couple said suction force said generated by said venturi valve region to said suction passageway.

\* \* \* \* \*